(12) United States Patent
Horesh et al.

(10) Patent No.: US 11,145,076 B1
(45) Date of Patent: Oct. 12, 2021

(54) INCORPORATION OF SEMANTIC INFORMATION IN SIMULTANEOUS LOCALIZATION AND MAPPING

(71) Applicant: R-Go Robotics LTD, Caesarea (IL)

(72) Inventors: Nizan Horesh, Caesarea (IL); Amir Geva, Zichron-Yaakov (IL); Tal Levy, Tel Aviv (IL); Noam Nisenholz, Kibbutz Ginegar (IL); Ben Matok, Or Akiva (IL)

(73) Assignee: R-Go Robotics LTD, Caesarea (IL)

( * ) Notice: Subject to any disclaimer, the term of this patent is extended or adjusted under 35 U.S.C. 154(b) by 0 days.

(21) Appl. No.: 17/231,744

(22) Filed: Apr. 15, 2021

Related U.S. Application Data

(60) Provisional application No. 63/106,303, filed on Oct. 27, 2020.

(51) Int. Cl.
| | |
|---|---|
| *G06K 9/00* | (2006.01) |
| *G08G 1/09* | (2006.01) |
| *G06T 7/579* | (2017.01) |
| *G06T 7/10* | (2017.01) |
| *H04N 5/235* | (2006.01) |
| *G06T 7/60* | (2017.01) |
| *G06T 7/73* | (2017.01) |

(52) U.S. Cl.
CPC ............ *G06T 7/579* (2017.01); *G06T 7/10* (2017.01); *G06T 7/60* (2013.01); *G06T 7/74* (2017.01); *H04N 5/2353* (2013.01); *H04N 5/2354* (2013.01)

(58) Field of Classification Search
USPC ....... 382/100, 103, 106–107, 104, 155, 162, 382/168, 154, 173, 181, 199, 206, 254, 382/274, 276, 285–291, 305, 312; 340/905, 935, 939
See application file for complete search history.

(56) References Cited

U.S. PATENT DOCUMENTS

| | | | |
|---|---|---|---|
| 2017/0248964 A1* | 8/2017 | Kentley | G08G 1/202 |
| 2019/0035165 A1* | 1/2019 | Gausebeck | H04N 13/156 |
| 2019/0043203 A1* | 2/2019 | Fleishman | G06N 3/04 |
| 2019/0147220 A1* | 5/2019 | McCormac | G06K 9/00208 382/103 |
| 2020/0300639 A1* | 9/2020 | Salfity | G06T 7/70 |
| 2020/0372285 A1* | 11/2020 | Adams | G06K 9/00798 |
| 2021/0000013 A1* | 1/2021 | Robertson | B25J 15/0019 |

* cited by examiner

*Primary Examiner* — Seyed H Azarian
(74) *Attorney, Agent, or Firm* — Schwabe, Williamson & Wyatt, P.C.

(57) ABSTRACT

Apparatuses, methods and storage media associated with an environment recognition system using SLAM pipeline with semantic segmentation are described herein. In some instances, the system is mounted on the body of the robotic apparatus, and includes one or more light sources, to illuminate a portion of an environment that surrounds the apparatus; a camera, to capture one or more images of the illuminated portion of the environment; and a processing device coupled with the camera and the light sources, to process the captured images, using semantic segmentation of the images applied in a SLAM pipeline. The processing is used to identify a position of the body of the apparatus, and/or a position of one or more objects disposed in the illuminated portion of the environment, based at least in part on a result of the processing of the one or more images. Other embodiments may be described and claimed.

20 Claims, 16 Drawing Sheets

INCORPORATION OF SEMANTIC INFORMATION IN SIMULTANEOUS LOCALIZATION AND MAPPING

CROSS REFERENCE TO RELATED APPLICATIONS

The present application claims priority to U.S. Provisional Patent Application No. 63/106,303, filed Oct. 27, 2020, entitled "INCORPORATION OF SEMANTIC INFORMATION IN SLAM PIPELINE," the entire disclosure of which is hereby incorporated by reference in its entirety for all purposes, except for those sections, if any, that are inconsistent with this specification.

TECHNICAL FIELD

The present disclosure relates to the field of robotics, in particular, to apparatuses and methods associated with using semantic information in simultaneous localization and mapping.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In the past few years semantic image segmentation and processing, as applied to incorporation of the semantic image information in image perception and specifically in Simultaneous Localization and Mapping (SLAM) pipeline, has become an important part of robotics technology. Semantic image segmentation and processing relates to extracting semantic information from an image and utilizing the extracted information for various purposes, such object detection, localization, and mapping. The process of the semantic image segmentation includes assigning a semantic label or class to image elements. An example may be assigning a proper label to every pixel in the image that belongs to the object such as, for instance, a sky, a car, or a house.

SLAM is the concept of estimating the sensor ego-motion and the geometry of its surrounding in a single mechanism. Vision based SLAM is sometimes referred to as V-SLAM. SLAM, in its full fledge, is an extensive computer vision pipeline. Semantic information can be incorporated into many of the pipeline stages. SLAM algorithms use static objects (or objects that move very slowly in relation to the camera motion) in order to compute camera self-motion and the geometry of the objects. Therefore, it is useful to have prior knowledge that relates to the image of an object and to the likelihood of movement of the object.

Semantic image segmentation may be a map or a table that assigns appropriate labels to the image's pixels (i.e., image of labels). The labels correspond to a predefined set of an object class. A class of objects may be application specific. For example, in autonomous driving paradigm, the labels can include an automobile, pedestrians, a road, traffic signs, etc. In some embodiments, labels may overlap. For example, some objects can belongs to more than one class and be hierarchical (e.g., "car" and "car wheel").

In recent years, deep learning has made the computation of such semantic maps a common practice. However, existing technologies related to the different stages (steps) of the SLAM pipeline may not always provide desired accuracy and computation speed. Incorporation of semantic knowledge in the SLAM pipeline as described below can improve various aspects of the algorithmic performance.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Apparatuses, methods, and storage media associated with an environment recognition system using SLAM pipeline with semantic segmentation are described herein. In some instances, the apparatus includes the environment recognition system in accordance with embodiments described herein. The system includes one or more light sources, to illuminate at least a portion of an environment that surrounds the apparatus; a camera, to capture one or more images of the illuminated portion of the environment; and a processing device coupled with the camera and the light sources, to process the captured images, using semantic segmentation of the images applied in a SLAM pipeline. The processing is used to identify a positon of one or more objects disposed in the environment (including the position of the apparatus), based at least in part on a result of the processing of the one or more images.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
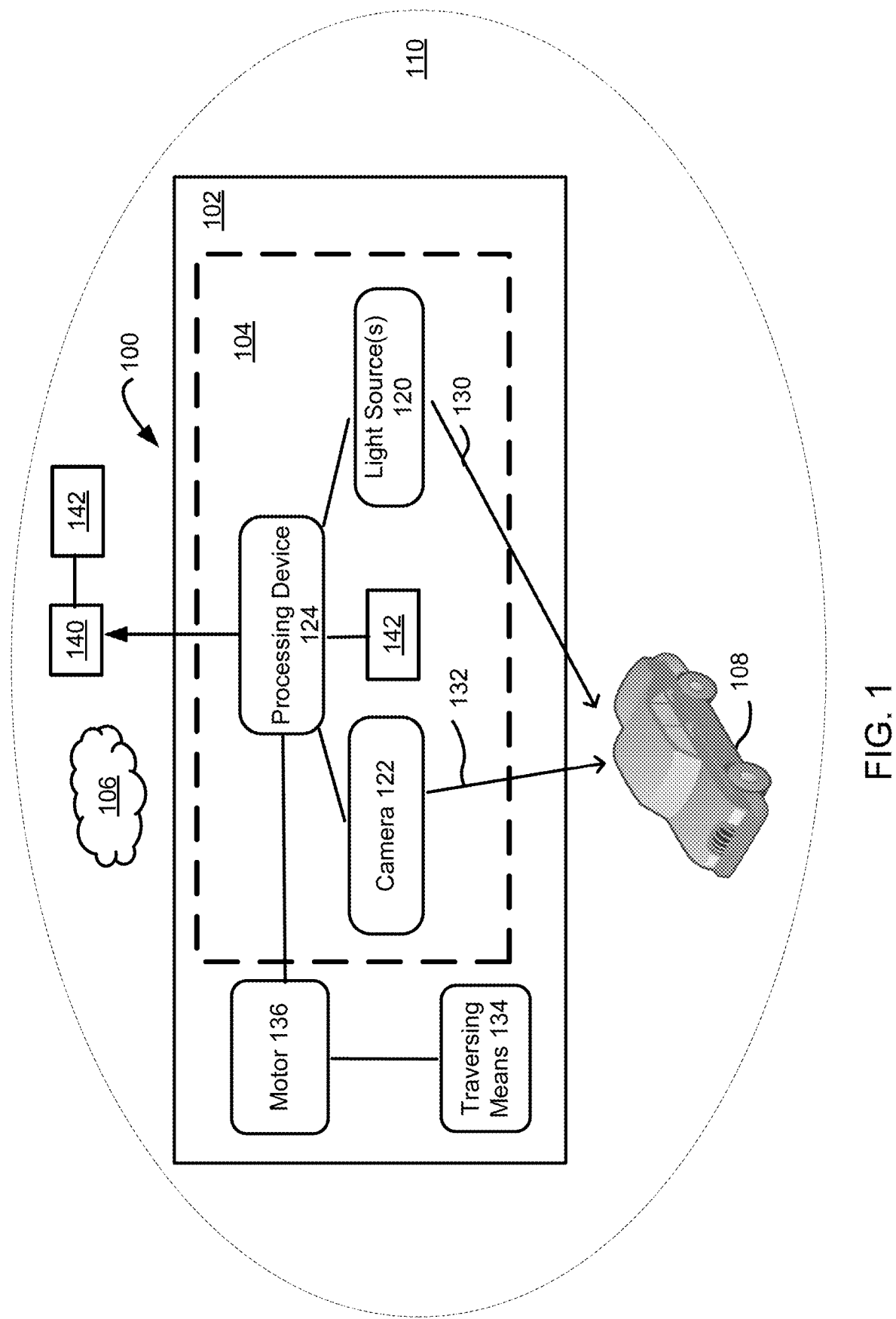
FIG. 1 is a block diagram illustrating an example robotic apparatus configured with a SLAM system with semantic segmentation, in accordance with some embodiments.

FIG. 1 is a block diagram illustrating an example robotic apparatus configured with a SLAM system with semantic segmentation, in accordance with some embodiments.

In embodiments, the apparatus 100 includes a body 102 configured to move in a surrounding environment 110. The apparatus 100 further includes an environment recognition system 104 configured to recognize environment 110, including objects disposed in the environment. The objects may include, for example, moving or static objects disposed on the surface of the environment 110 or above the surface of the environment 110. The objects may further include, but are not limited to, cars (e.g., 108), buildings, bridges, roads, sidewalks, sky, clouds in the sky (e.g., cloud 106), people, animals, trees, bushes, or the like.

The environment recognition system 104 may be mounted or otherwise disposed on the body 102 of the apparatus 100. In embodiments, the system 104 includes one or more light sources 120, to illuminate 130 the environment 110 (or at least a portion of the environment 110, such as object 108). The system 104 further includes a camera 122, to capture 132 one or more images of the illuminated portion of the environment (e.g., including object 108). The system 104 also includes a processing device 124 coupled with the camera 122 and the light sources 120. The processing device 124 is configured to process the captured images of the portion of the environment 110, to identify a position of objects (e.g., 106, 108) disposed in the environment 110 (known as localization), based at least in part on a result of the processing of the images, using the SLAM system according to the embodiments described herein. In embodiments, the objects whose position is to be identified include the apparatus 100. In embodiments, the processing device 124 is configured to process the captured images of the portion of the environment 110, to estimate the geometry of the environment 110, and/or to detect, or cause to be detected, the objects 106, 108.

For example, the processing device 124 can be configured to identify or cause to be identified the position of the object (e.g., 100, 106, or 108), based at least in part on the processed images, and adjust or cause to be adjusted a trajectory (e.g., direction, speed, and/or the like) of the environment 110 being traversed by the apparatus 100, based at least in part on the position of the identified object. In embodiments, the processing device 124 may comprise some or all of the components of a computing device, described below in reference to FIG. 14.

More specifically, the processing device 124 may be configured to implement various embodiments of the environment recognition process using the SLAM system with semantic segmentation described herein. For example, the processing device 124 is configured to control the illumination of the environment 110 by the light sources 120, corresponding image capturing by the camera 122, and processing the captured images according to techniques described herein. In other words, the processing device 124 may be configured with a SLAM engine 142 (e.g., software, firmware, or a combination thereof) that implements the environment recognition techniques using semantic segmentation described herein.

In some embodiments, the processing device 124 can be configured to provide environment recognition, based on the instructions provided in the SLAM engine 142 and executed on the processing device 124. In some embodiments, the processing device 124 is configured to pre-process the captured images and communicate the results to an external device 140 for further processing and obstacle detection according to the SLAM engine 142. For example, the SLAM engine 142 can be implemented as software executable on the external device 140. The configuration of the SLAM engine 142 with semantic segmentation according to the embodiments disclosed herein is described in greater detail in reference to FIG. 2 and subsequent figures.

In embodiments, the apparatus 100 may include other components necessary for surface traversing. For example, in some embodiments, the apparatus 100 can include a traversing means (e.g., wheels) 134, and a motor 136 to operate the traversing means 134. In embodiments, the motor 136 may be disposed inside the body 102. The processing device 124 can be further configured to control the motion of the apparatus 100 (e.g., by controlling the motor 136 operation), based at least in part on the results of the environment recognition provided by the SLAM engine 142 in accordance with some embodiments.

For example, the SLAM engine 142 may be utilized to provide an estimation of a position of an object, distance from the apparatus 100 to an object, and the object's dimensions (e.g., height, depth, or the like). In addition the SLAM engine 42 may be utilized to estimate the position and orientation of the body 102 of the apparatus 100 and/or its sensors, using the camera 122. Accordingly, the techniques described above may be applied in robotic apparatuses (e.g., 100) that traverse environment 110 with objects, in order to estimate the apparatus and/or the object location in the environment 110 and, in some embodiments, to estimate the geometry of the environment 110.

As noted above, the SLAM engine 142 can be provided with semantic segmentation, described in detail. In other words, the SLAM engine 142 implements the SLAM pipeline with semantic segmentation as described herein according to some embodiments. The SLAM pipeline can utilize sematic segmentation in various stages of the pipeline. Generally, those improvements can be applied independently of each other.

First, the semantic segmentation map associated with environment 110 can be defined. The semantic segmentation map can be provided as follows. For each (or one or more) image pixel the map can assign one of multiple labels, while the labels correspond to a semantic category of objects. Semantic category is class of objects that have some meaning in common language, such as "cars," "roads," "buildings." Accordingly, labels for the map can include (but are not limited to) sky, topographical features, architectural features, fixed furniture (e.g., shelves), mobile furniture (e.g., chairs), trees, other vegetation, humans, animals, vehicles, text signs, and artificial light sources.

The semantic map can be computed using a deep neural net (e.g., with the U-Net architecture) that is, for example, trained for this specific purpose by standard deep learning methods. To each label, atypical time scale for its mobility can be assigned using a pre-defined table. The time scale can be defined in terms of how long a feature remains static (within given motion of one centimeter accuracy, for example) with probability, for example, greater than a threshold (e.g., 0.9). Examples of typical time scales are shown in Table 1. In some embodiments, other implementations may directly infer a map that relates image information with a time scale.

TABLE 1

| Label | Time scale |
|---|---|
| Sky | 1 sec |
| Vehicles | 0.1 sec |
| Human | 0.1 sec |
| Animal | 0.1 sec |
| Mobile furniture | 1 week |
| Vegetation | 1 week |
| Trees | 1 month |
| Fixed furniture | 6 months |
| Text sign | 6 months |
| Architectural features | 3 years |
| Topographical features | 10 years |

Having defined the semantic segmentation map of the environment, the SLAM system with semantic segmentation can be described.

Figure 2:
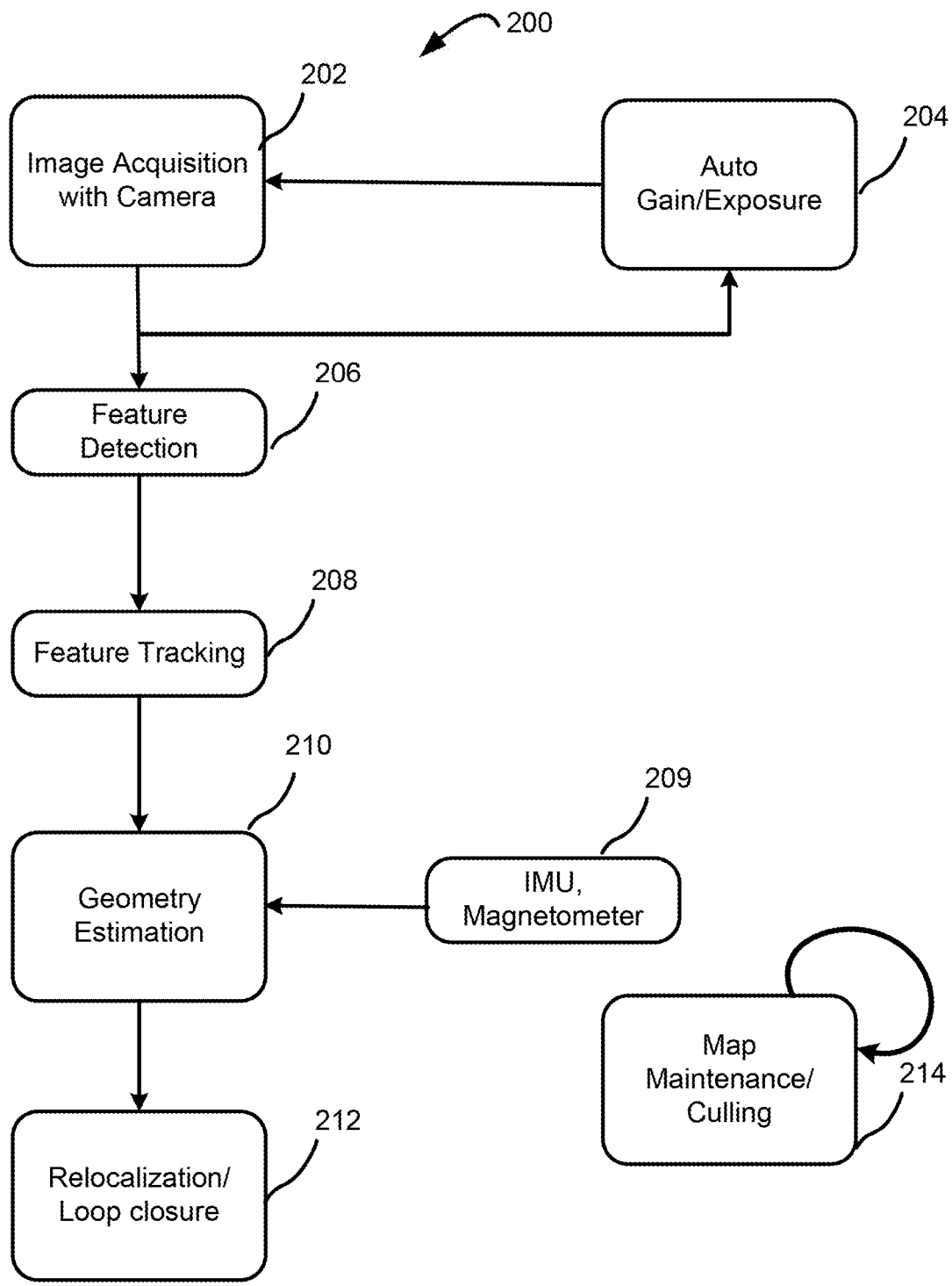
FIG. 2 is an example diagram illustrating the SLAM system with semantic segmentation, in accordance with some embodiments.

FIG. 2 is an example diagram illustrating the SLAM system with semantic segmentation, in accordance with some embodiments. In embodiments, the SLAM system with semantic segmentation can be provided in the SLAM engine 142 described in reference to FIG. 1, and may be executed on the processing device 124 mounted on the robotic apparatus 100.

At block 202, the image acquisition with a camera (e.g., 122) is performed. The image of the environment or portion thereof may be acquired, as described in reference to FIG. 1. During image acquisition the camera parameters need to be set. Camera parameters commonly include exposure time, gain values, illumination (e.g., flash). Some more complicated camera systems may also include aperture, zoom, pan and tilt, adjustable neutral density filter etc. The determination of camera parameters can be performed by optimization of the parameters with relation to some statistical measure of the image quality (e.g., mean intensity, histogram entropy, or the like).

At block 204, auto gain and/or exposure are applied to image acquisition at block 202. As shown, auto gain and exposure is looped with the image acquisition performance.

In embodiments, the image acquisition may be enhanced using the semantic segmentation. The image acquisition and auto exposure feedback using the semantic segmentation is described in reference to FIG. 3.

At blocks 206 and 208, image feature detection and image feature tracking are performed. Here, image features (typically sparse keypoints associated with objects in the environment) are detected and then tracked between image frames. In the context of computer vison, keypoint is a location in the image that is interesting/salient. In the task of tracking, keypoint is a location that is easy to detect and track. The tracking records associated with keypoints are then transferred to the geometrical state estimator 210 (e.g., bundle adjustment, extended Kalman filter). For a given keypoint, the tracking record is a list of the records. A record includes the frame time, keypoint location (in the image plane) and optionally the associated semantic label (which can be obtained at block 404 of FIG. 4 described below). The list includes such a record for each frame with valid tracking. As described in reference to FIG. 16, the tracking records may include creation times associated with the features (keypoints).

In other words, the records of the tracking results are being kept and stored. For example, for a keypoint what can be stored is:

(time_1, xy_1, label_1), (time_2, xy_2, label_2), . . . (time_N, xy_N, label_N), where time_i is the time of the frame xy_i is the position of the keypoint at the frame, and label_i is the semantic label of the keypoint.

At block 210, geometry estimation of objects in the environment is performed. For example, the 3D geometry of the environment with the objects positioned in the environment may be estimated. In particular, the estimation of the 3D position of the keypoints and 6D (position and orientation) of the camera 122 (or the apparatus body 102) at different times (e.g., at keyframes) can be performed. The geometrical state estimator estimates the 3D locations of the keypoints as well as the 3D locations and orientations of the camera at the corresponding time of image frames acquisition. The 3D locations of the keypoints will be used in FIG. 6 as described below. Block 210 will maintain the semantic labels of the input keypoints and will pass them with their 3D estimation to FIG. 6.

In embodiments, the process 200 can take into account inertial measurements, as in, for example, Visual-Inertial SLAM. The inertial measurements can be provided at block 209 and input to block 210. The geometrical state estimator relies on the assumption that the tracked image keypoints represent static objects (denoted as "static keypoints") in the environment. It is therefore clear that only static keypoints should be used by the geometrical state estimator.

As is known in the art of computer vision, there are various methods to reject tracked points that do not satisfy this assumption (either due to false tracking or due to tracking of a non-static object). The examples include consistent backtracking, epipolar filtering, and random sample consensus (RANSAC). In embodiments, the feature tracking and geometry estimation may be enhanced using the sematic segmentation, as described in detail in reference to FIGS. 4-5.

At block 212, relocalization is performed. Relocalization is the process where places or objects in the environment that have been viewed in the past are identified again (i.e., there is no continuous tracking of the image features). Here the conventional approach is to identify candidate frames with similar visual information (e.g., using Distributed Bag Of Words (DBoW), match corresponding keypoints between the frames (e.g., match scale-invariant feature transform (SIFT) descriptors), and compute the geometrical relation between the frames (e.g., using Perspective-n-Point (PnP)). In embodiments, relocalization may be enhanced using the sematic segmentation, as described in detail in reference to FIGS. 5-10.

In parallel with the above processes, at block 214 map maintenance and culling can be performed. In the SLAM pipeline execution, data related to environment and its objects is accumulated. It is a common practice to apply filtering/culling of the data (mostly 3D features and key-frames) in order to maintain bounded memory and runtime.

Figure 3:
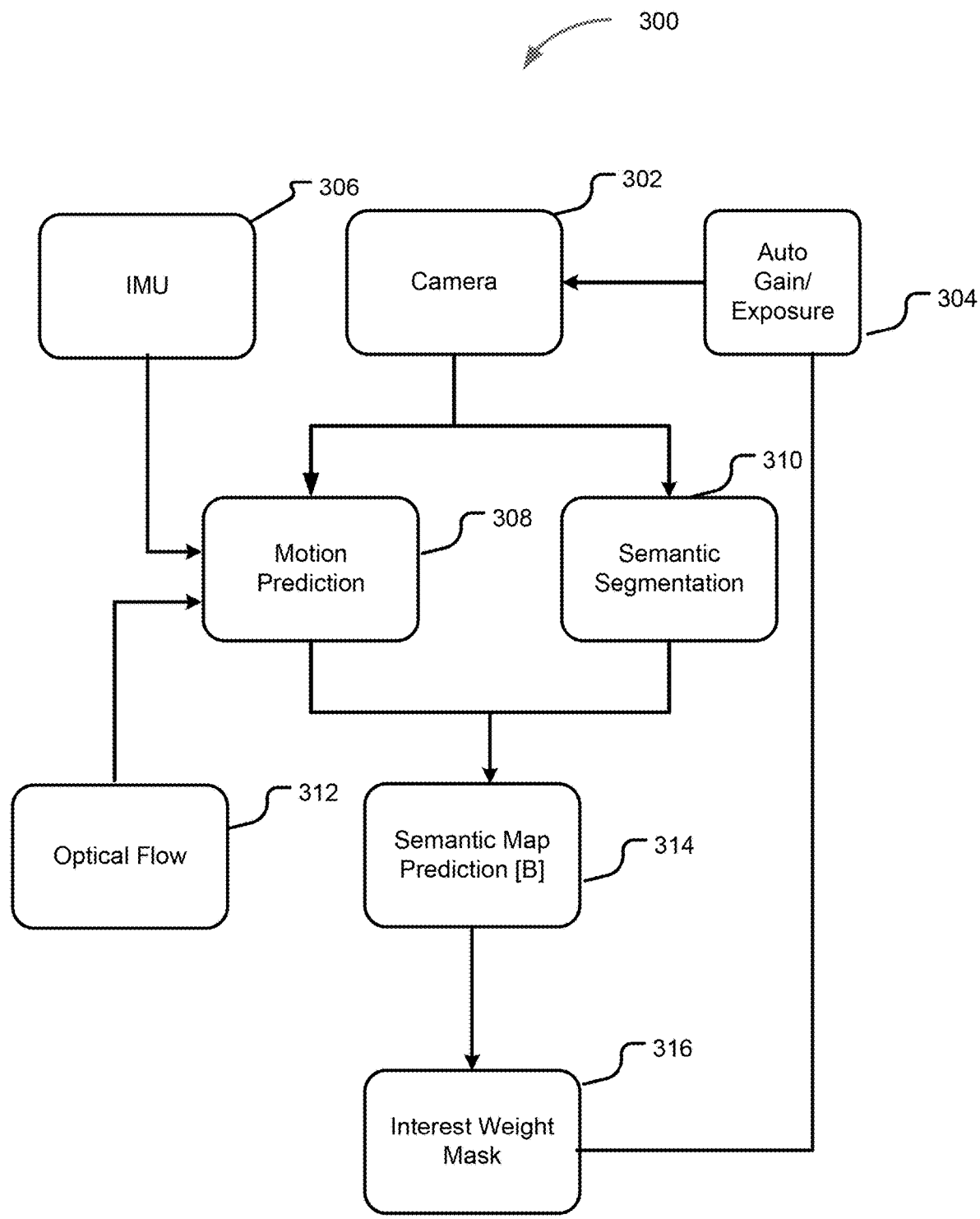
FIG. 3 illustrates an example process for image acquisition and auto exposure feedback using the semantic segmentation, in accordance with some embodiments.

FIG. 3 illustrates an example process for image acquisition and auto exposure feedback using the semantic segmentation, in accordance with some embodiments. The process 300 may be performed by a processing device of the system, such as the device 124 of FIG. 1.

Blocks 302 and 304 provide for image acquisition as described in reference to FIG. 1. At block 306, an inertial measurement unit (IMU), commonly composed of an accelerometer and a gyroscope, can provide for sensor data collection associated with the motion of the apparatus.

As noted in reference to FIG. 1, the determination of camera parameters can be performed by optimization of the parameters with relation to some statistical measure of the image quality (e.g., mean intensity, histogram entropy). For example, the exposure parameters can be computed as $$\text{ArgMin}_{exp}\left(\text{abs}\left(\left(\frac{1}{N}\sum_{i} I_{exp}[i]\right) - I_0\right)\right),$$

where the ArgMin is taken over the exposure parameters, $I_{exp}[i]$ are the image pixel intensity values (the image is captured with the given exposure parameters), N is the number of pixels and $I_0$ is the target mean intensity of the image, e.g., intensity level 128, which is intensity level at the middle of the sensor intensity range, e.g., 128 for an 8-bit imager that outputs value 0-255.

In embodiments, the semantic segmentation map (block 310) described in reference to FIG. 1 can be used to assign weights to image regions according to their importance for the SLAM process. For example, zero weight can be given to sky pixels (as those do not present any significance for the SLAM process; either no features representing clear sky or volatile features representing clouds). Low weight can be given to humans or animals and vehicles, e.g., value of 0.2. High weight can be given to topographical and architectural features, e.g., value of 0.9. Accordingly, the formula above can be modified as follows:

$$\text{ArgMin}_{exp}\left(\text{abs}\left(\left(\frac{1}{\sum_i w[i]}\sum_{i} w[i] \cdot I_{exp}[i]\right) - I_0\right)\right),$$

where w[i] are the weight at the location of pixel I[i]. The interest weight mask is a map that holds, for every pixel, a value (e.g., weight) that indicates how "interesting" (e.g., important, salient) this pixel is, as implied by its semantic label. Using the interest weight mask at block 316, the exposure parameter adjustment can result in an acquired image with better image information in the high weight regions compared to low weighted regions and overall better information for the specific application (e.g., SLAM). This scheme requires knowledge of the semantic map with low latency, e.g., low time between image frames, so there is enough time to compute and set the new exposure parameters. This can be challenging due to the typical high latency of the process of computing the result of a neural network, known as deep neural networks inference (e.g., hundreds of milliseconds on CPU).

In embodiments, this issue can be addressed by predicting the latest semantic map at the current frame time. The prediction can be achieved by first calculating the optical flow (block 312) between the reference frame of the semantic map to the latest tracked image (which is still one frame behind the current one). An optical flow is the velocity (at a given time) of elements of the viewed scene as observed at the imaging plane. There are known methods to estimate optical flow, such as, for example, Lucas-Kanade method.

At block 308 (motion prediction component), complementary sensors (gyro, accelerometer, magnetometer, encodes), which have significantly lower latency (few milliseconds) can be used to calculate the camera motion (e.g., when the camera 122 is mounted on the moving robotic apparatus 100), and thus approximate the optical flow for far objects. This technique allows to predict the image motion by calculating the optical flow (at block 312) between the latest tracked image and the current acquired image, e.g., with milliseconds latency. For example, optical flow provides an estimate of the pixel velocity. Given position x at time t0 and velocity v the pixel position at time t1 can be predicted as t1=x+(t1−t2)*v.

Given the optical flow, the semantic segmentation map (block 314) is predicted at the current time, and then weights are assigned to the map at block 316. In other words, given the predicted semantic map, weights can be assigned to each pixel according to their semantic label. Once the weights have been assigned, the interest weight mask is provided to block 304. Alternatively, the 3D motion of the camera, computed by the visual odometry component of the SLAM pipeline (not shown in FIG. 1), can be used. The optical flow can then be derived from the 3D geometry of the scene. In summary, the process of FIG. 3 provides the continuous process of adapting the parameters of the camera 122 (FIG. 1) to the scene content.

Figure 4:
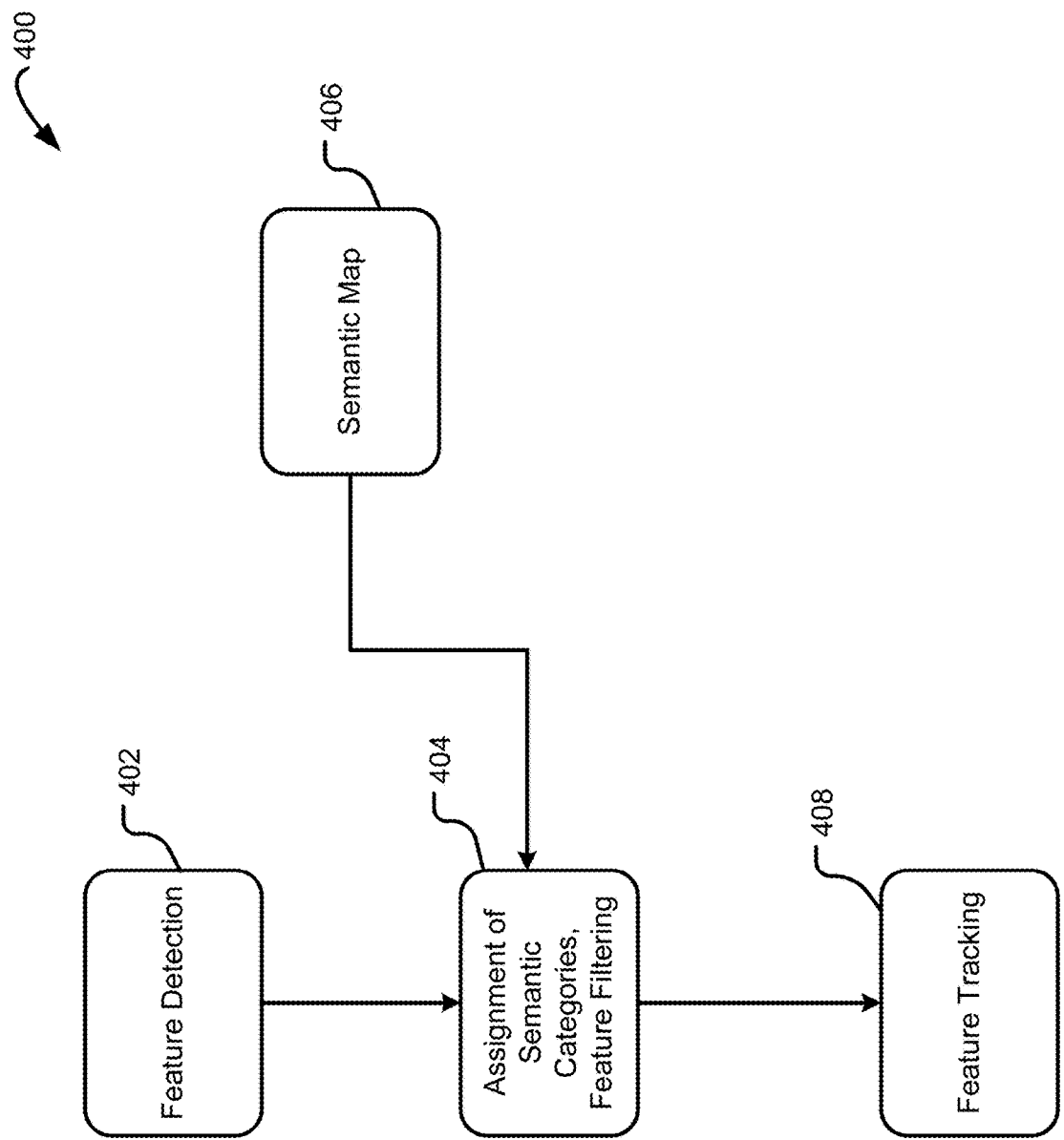
FIG. 4 illustrates an example process for object feature tracking using the semantic segmentation, in accordance with some embodiments.

FIG. 4 illustrates an example process for object feature tracking using the semantic segmentation, in accordance with some embodiments. The process 400 may be performed by a processing device of the system, such as the device 124 of FIG. 1. As described above, image features (keypoints) are detected and tracked between image frames. The tracking records are then transferred to the geometrical state estimator, where the keypoint locations are estimated, based on the assumption that the keypoints represent static objects. In embodiments described herein, semantic criteria can be applied to a filter (i.e., to disqualify) keypoints. For example, keypoints labeled as "car" can be disqualified because the car is not a static object.

For example, the object features can be detected at block 402. Semantic categories can be assigned to keypoints at block 404 using the semantic map (block 406). Keypoints that belong to objects with high mobility, such as sky, animal, and human, can be eliminated and may not be used by the geometrical state estimator (described below in reference to FIG. 5, block 508). Keypoints that belong to objects with medium and low mobility may be considered further (i.e., other filters such as an epipolar filter can be applied at block 404). A semantic label or labels can be assigned to each relevant keypoint at block 404. Once a semantic label is assigned to a keypoint, the label can be maintained (e.g., saved) while tracking the features between frames at block 408. (The labels maintained at block 408 will be used in FIG. 6 as described below.) In other words, the semantic map does not need to be computed for every frame. Alternative implementation can be to filter the features at the feature detection stage. In summary, the output of the process 400 of FIG. 4 are keypoints (features) that are tracked (i.e., their location at a sequence of frames is known) and assigned semantic labels. The process 400 describes in detail the actions of blocks 206-208 of FIG. 2.

Figure 5:
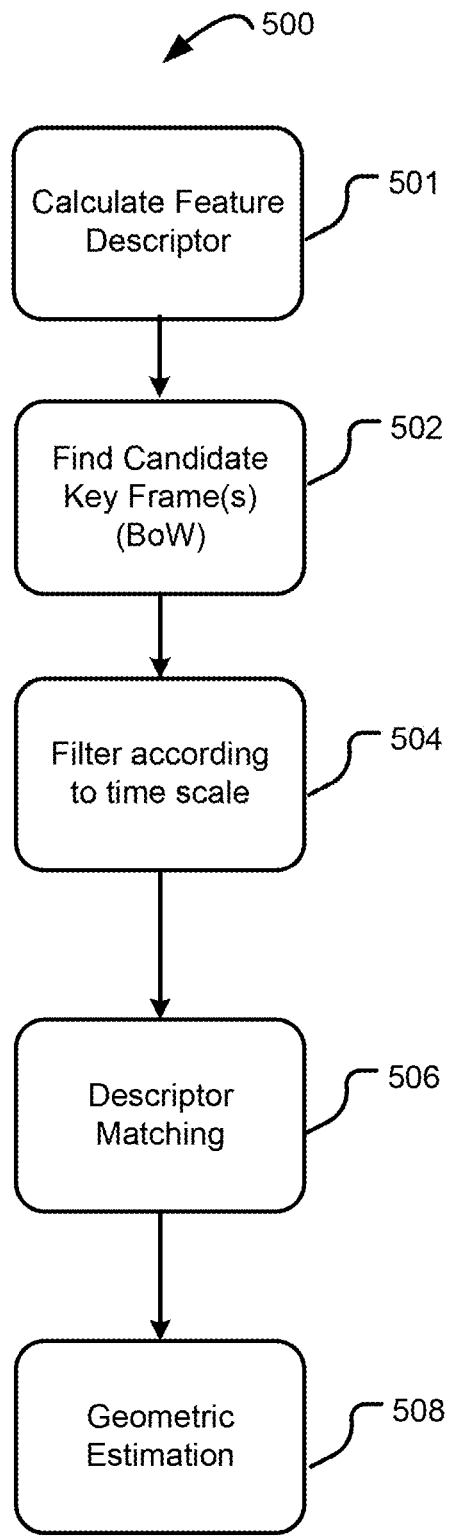
FIG. 5 illustrates an example relocalization process using the semantic segmentation, in accordance with some embodiments.

FIG. 5 illustrates an example relocalization process using the semantic segmentation, in accordance with some embodiments. The process 500 may be performed by a processing device of the system, such as the device 124 of FIG. 1. As noted above, relocalization is the process where places (objects) in the environment that have been viewed in the past are identified again (because there is no continuous tracking of the image features). As noted above, in conventional solutions, candidate frames with similar visual information (which can be generated as feature descriptors generated at block 501 (feature descriptor), can be identified at block 502 (e.g., using Bag-of-Visual-Words (BoW)). Corresponding keypoints between the frames can be matched at block 506 (e.g., matching Scale Invariant Feature Transform (SIFT) descriptors). The geometrical relation between the frames can then be computed at block 508 (e.g., using PnP).

In the described embodiments, the feature descriptor (e.g., SIFT) at block 501 can be replaced with a learned feature descriptor (e.g., Learned Invariant Feature Transform (LIFT)). Normally, such a descriptor is trained over an entire image database. In the described embodiments, training can be separated for each of the specific semantic classes. Further, the keypoints can be filtered at block 504 by requiring that the expected mobility time scale of the features will be larger than the time duration between the current frame and the candidate frame (frames) at block 502.

Another relocalization mechanism according to the embodiments described herein can be based more heavily on semantic segmentation.

Figure 6:
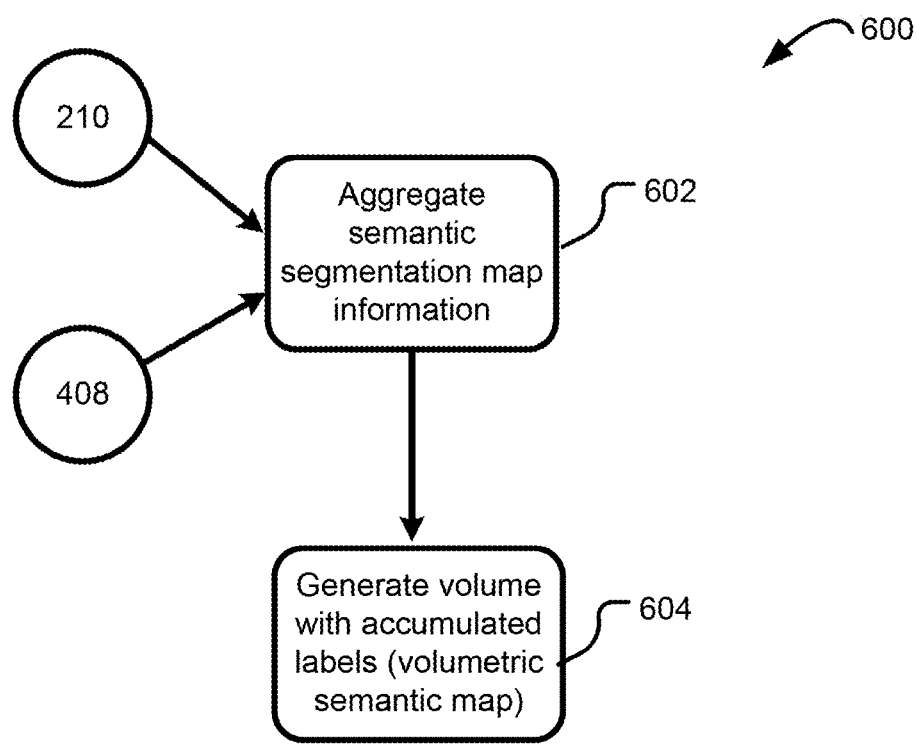
FIG. 6 illustrates an example process for accumulation of the semantic segmentation information, in accordance with some embodiments.

FIG. 6 illustrates an example process for accumulation of the semantic segmentation information, in accordance with some embodiments. The process 600 may be performed by a processing device of the system, such as the device 124 of FIG. 1.

At block 602, each of the 3D keypoints (output of block 210 of FIG. 2) is assigned with a semantic label or labels. Block 602 receives from 210, for each of the 3D keypoints (e.g., "real space" keypoints), the set of the semantic labels of the 2D keypoints (image keypoints) that corresponds to that 3D keypoints. Those semantic labels were created at block 406 and passed to block 408 of FIG. 4 (and then to FIG. 5), from which they can be retrieved at block 602. Then, a representative label is computed of this set. For example, the representative label is chosen to be a label that is in agreement with, e.g., 80% of the labels. If no such label exist, this keypoint may be ignored. The result of this process is a set of 3D keypoints and their corresponding semantic labels. In other embodiments, the 3D keypoints input can be taken from an external sensor (3D camera, dense monocular stereo). The set of 3D keypoints and labels is inputted in block 604.

In summary, in some embodiments the label can be computed once and maintained, thus reducing the computations. In some embodiments, the label can be computed for every frame and then chosen using, e.g., majority voting ("partial consensus"), thus increasing robustness.

At block 604, the volume with aggregated labels from multiple frames is generated. The label aggregation is the process of aggregating label information (e.g., 3D volume element with label) across multiple frames, possibly taken from different positions. This is important as a single image information can be limited due to (at least) occlusions. Volume element is an element of a partition of the 3D space into, for example, one cubic cm grid. The label aggregation at block 604 can be done by assignment of a label with 3D information to the corresponding volume element. If a volume element contains multiple labels, the representing label will be taken by, for example, a majority vote. In summary, the process 600 of FIG. 6 can be combined with the process of FIG. 7 (e.g., blocks 702 and 704 described below), to implement an embodiment of relocalization of block 212 in FIG. 2.

Figure 7:
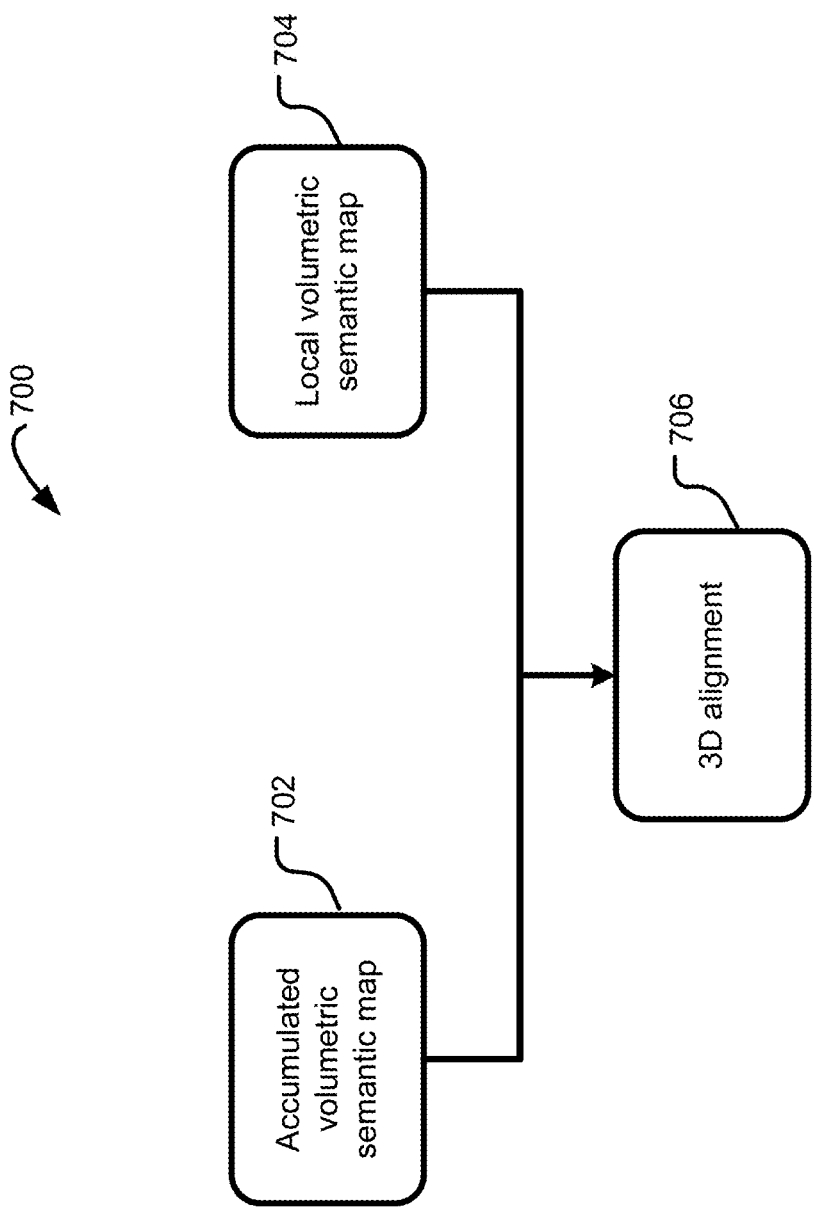
FIG. 7 illustrates an example process for alignment of global and local semantic maps, in accordance with some embodiments.

FIG. 7 illustrates an example process for alignment of the local and global (accumulated) semantic maps, in accordance with some embodiments. The process 700 may be performed by a processing device of the system, such as the device 124 of FIG. 1.

The relocalization process for map alignment can be provided as follows. A map is the map containing labels aggregated during a period of time. A local semantic 3D map (block 704) can be accumulated over a short period of time, e.g., may be built during the last 30-60 seconds of the operation. A global semantic 3D map (block 702), can be accumulated over a long period of time, e.g., may be built during previous travelling in the environment.

The local map can be aligned to the global map in order to find a match. The matching of the maps can be done by searching for alignment with a lowest distance metric at block 706. The alignment is applied by a rigid 3D motion (i.e., 3D rotation and translation) of the local map. The distance metric reflects the label similarity. More rigorously, the alignment parameters can be computed as: $ArgMin_{r,\theta} \Sigma_{x, y, z} d(LM(T_{r,\theta}(x,y,z)), GM(x,y,z))$, where LM is the local map (label at position x,y,z), GM is the global map (label at position x,y,z), $T_{r,\theta}$ is the rigid transformation of the coordinates, parameterized over translation vector r and three Euler angles θ. $d(l_1, l_2)$ is the distance metric between the labels $l_1$, $l_2$. One example for the metric is $d(l_1, l_2) = \{0_{l_1 = l_2}^{1}{}_{l_1 \neq l_2}$, other example can be $d(l_1, l_2) = 1 - ConfusionMatrix(l_1, l_2)$. Confusion matrix is a commonly used, and it is defined as ConfusionMatrix$(l_1, l_2)$=the probability to get label $l_1$ given the true label $l_2$. This relocalization mechanism may be less accurate than classical PnP, but it is very robust to visual conditions (illumination, visibility, etc.). Other implementations may use a 2D structure created from a projection of the 3D structure onto the surface.

Figure 8:
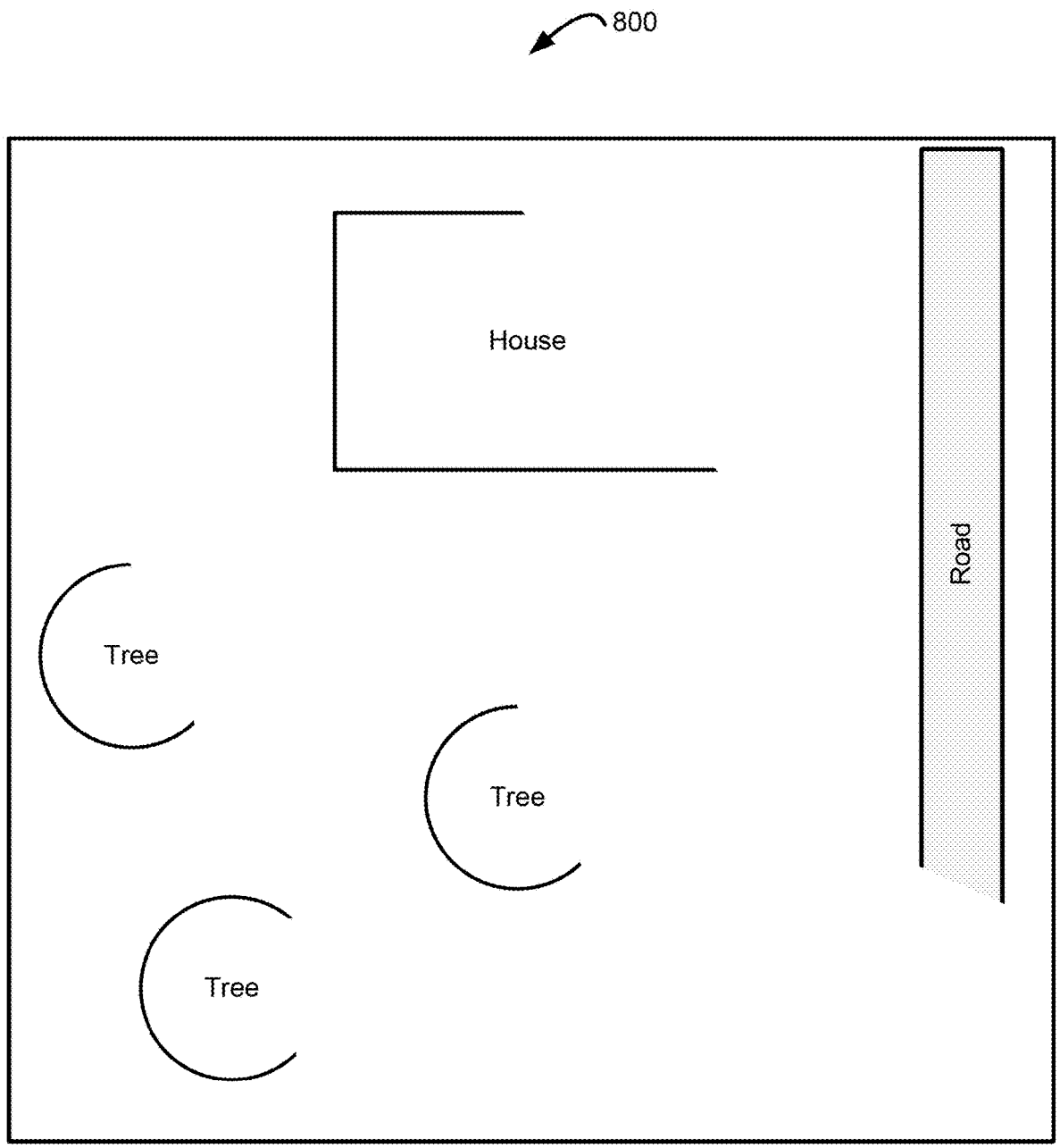
FIGS. 8 and 9 illustrate examples of a local semantic map and a global semantic map respectively, in accordance with some embodiments.
Figure 9:
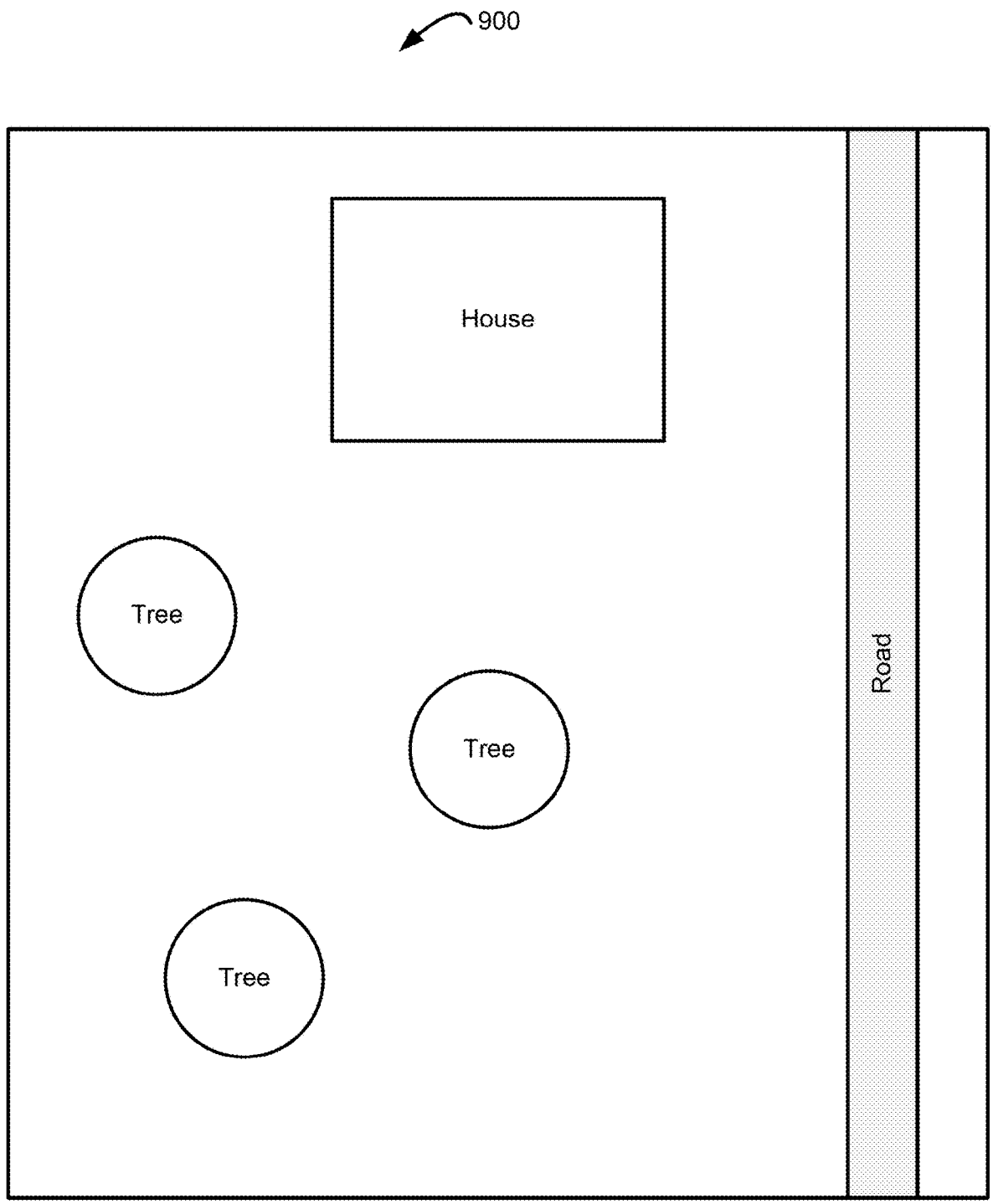

FIGS. 8 and 9 illustrate examples of a local semantic map and a global semantic map respectively, in accordance with some embodiments. The maps 800 and 900 are illustrated in 2D rather in 3D for simplicity. As noted above, a local map can be created from 3D information accumulated over the last minute (or minutes) of operation of the robotic apparatus moving in the environment (short time period), while a global map can be created from 3D information accumulated from previous travel of the robotic apparatus in the environment (e.g., time period prior to the last minute (or minutes) of operation (long time period)). In other words, the global map may be created prior to a creation of the local map.

Accordingly, the global map 900 can be dynamically created by accumulating the labels, obtained over a portion of the robot movements, except for the most recent ones (that are used for the creation of the local map 800). The local map 800 can be dynamically created using the accumulated image information over a short time period (e.g., the last minute of operation of the robotic apparatus moving in the environment).

As shown, the image in map 800 is incomplete because the camera has not yet viewed all the scene parts. As described above, the like objects on the local and accumulated semantic maps can be compared and aligned (e.g., respective trees, road, or house in FIGS. 8 and 9). More specifically, volume elements (voxels) and their respective semantic labels can be compared in maps 800 and 900. For 2D illustration purposes, those are the area elements to compare, as opposed to pixels (in the sense of pixels on the imager). As a result of the comparison, maps 800 and 900 may be aligned (e.g., 2D arrays of respective elements can be aligned). For example, the tree voxels of 800 can be compared with (potentially all) voxels of 900. At the optimal alignment (if found correctly) the (voxels of the) tree in 800 and the (voxels of the) tree in 900 can maximally overlap.

Yet another relocalization mechanism is based on objects segmentation, a.k.a. instance segmentation. In the instance segmentation map, different labels are assigned to different instances of the same class. For example, two cars (with potential overlap) each have distinct labels rather than just the label "car"; in other words, each car can be labeled separately.

Figure 10:
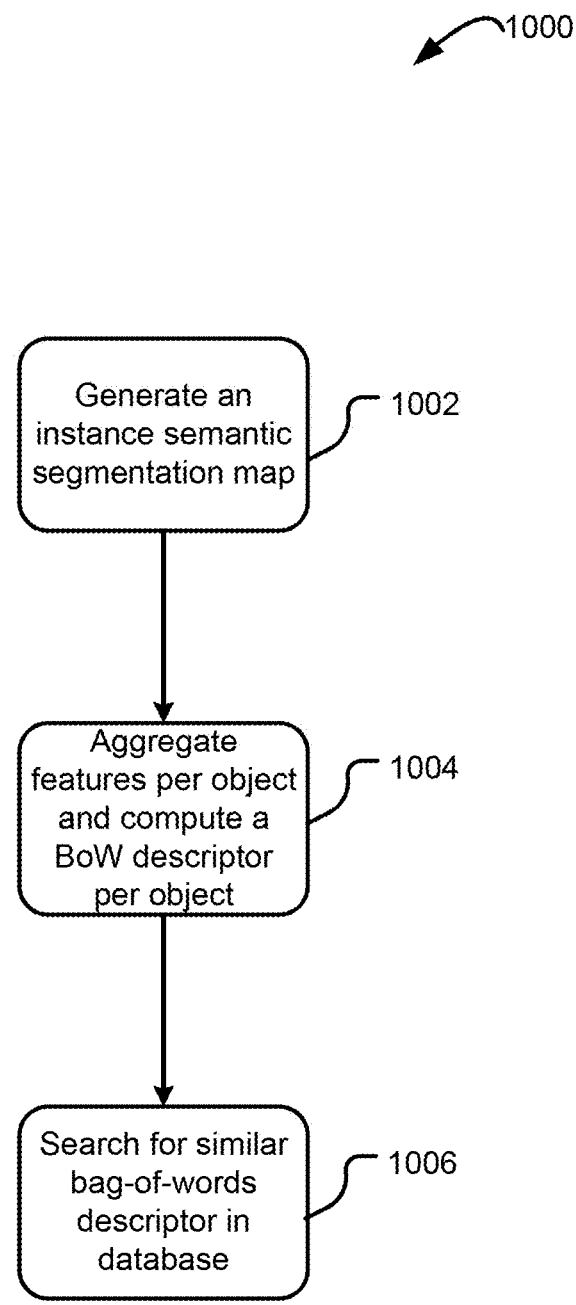
FIG. 10 illustrates an example process of relocalization using object segmentation, in accordance with some embodiments.

FIG. 10 illustrates an example process of relocalization using object segmentation, in accordance with some embodiments. The process 1000 may be performed by a processing device of the system, such as the device 124 of FIG. 1.

At block 1002, an instance/object segmentation map is generated for the input frame. The map generation is similar to the semantic segmentation map generation described above, where a label was assigned to each pixel. Here, different object instances get different labels (i.e., two cars will each have different labels "car 1" and "car 2").

At block 1004, using the object segmentation, features are aggregated per object and a BoW descriptor per object is computed. Feature descriptors of each object are aggregated in a bag-of-words (BoW) descriptor to create an object-level descriptor. Specifically, features (and corresponding descriptors) are aggregated according to their object instance (e.g., "car 1"). The BoW descriptor is computed over these aggregated features (rather than being computed over the features of the entire frame).

This type of descriptor is significantly more powerful than keyframe base visual descriptors. Bag-of-words is a technique that provides for a creation of a single descriptor from multiple descriptors that represents a single entity. The technique includes a computationally-efficient method to search for a similar bag-of-words descriptor within a database of bag-of-words descriptors historically (previously) assembled and stored.

At block 1006, a search is performed for similar bag-of-words descriptors in the database, to match with bag-of-words created from the aggregated feature descriptors. The object-level descriptors can be searched in the database of the stored object-level descriptors in a similar manner to that of keyframe search at block 506 of FIG. 5. In other words, the matching of the object-level descriptors with the database can be done using bag-of-visual-words.

In embodiments, the environment may include printed text (e.g., notes, billboards, signs, and the like). The image features of printed text may require a specific treatment in the SLAM process. When text features are matched, during, for example, the relocalization process, it is beneficial to have a strict distinction between the text such as "Aisle 11" and "Aisle 12," even though their image information is mostly the same (e.g., about 85% similarity).

Figure 11:
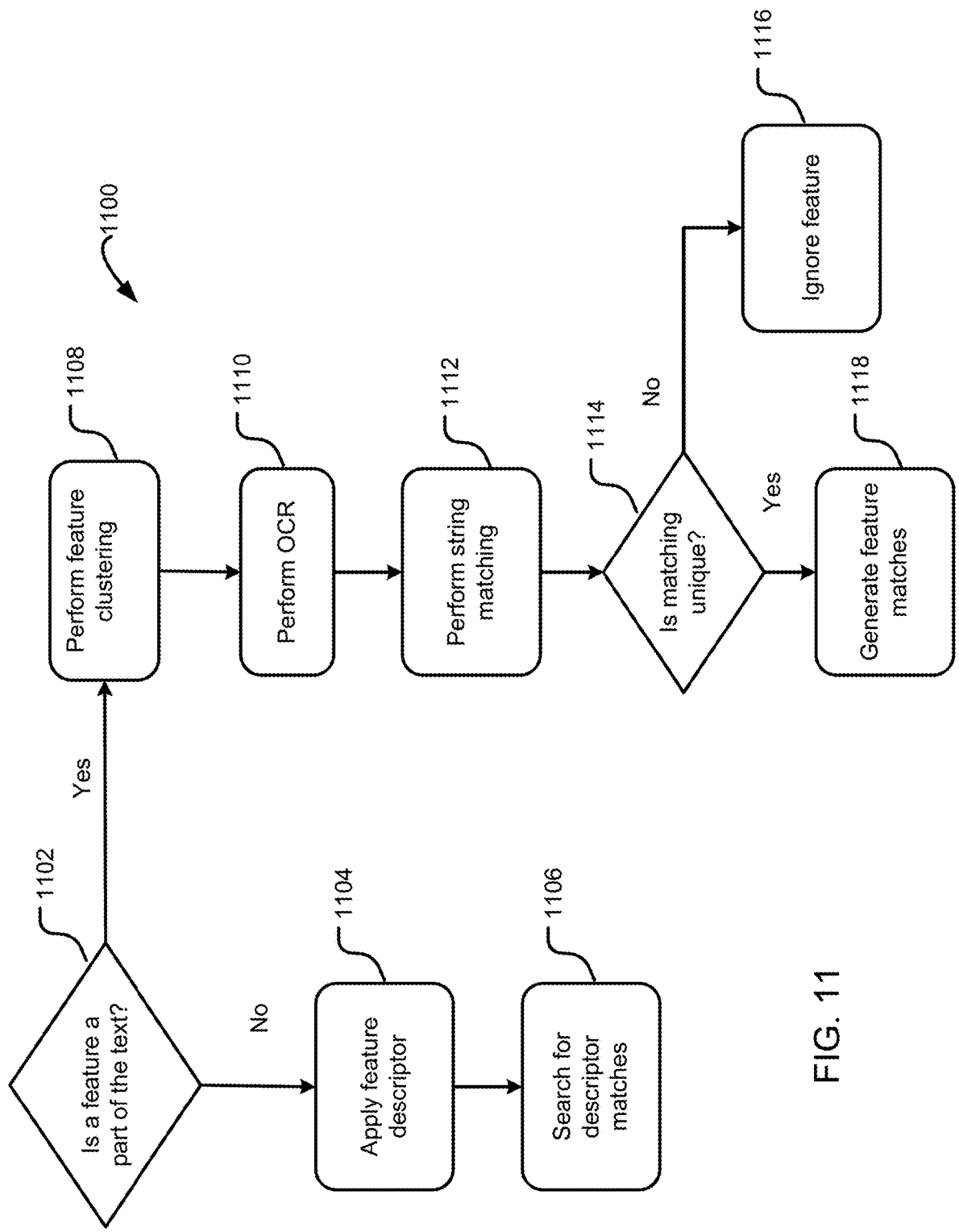
FIG. 11 illustrates an example process of text processing, in accordance with some embodiments.

FIG. 11 illustrates an example process of text processing, in accordance with some embodiments. The process 1100 may be performed by a processing device of the system, such as the device 124 of FIG. 1. In embodiments, the process 1100 corresponds to feature detection (block 206, FIG. 2), feature descriptor calculation (block 501) and descriptor matching (block 506 of FIG. 5). First, the feature can be classified as "text" and "non text" at decision block 1102, using, for example, a pre-trained neural net.

If the feature is not classified as text, at block 1104 a feature descriptor is applied, and at block 1106 a search for matching descriptions is performed, similar to conventional solutions.

If it is determined at block 1102 that the feature is classified as text, the process 1100 moves to block 1108.

At block 1108, text features that belong to the same logical unit (i.e., word, sentence) can be clustered, for example, using orientation, font, color, and location, known in the art of computer vision.

At block 1110 the features can be translated to a text by, for example, applying an Optical Character Recognition (OCR) algorithm. The text output of block 1110 (e.g., a string of characters) is inputted in block 1112.

At block 1112, a string matching (including partial matching) is performed on the text collected during the SLAM process (and possibly pre-loaded data from previous running of the system and/or data predetermined by the user). String matching comprises a search for an exact (or approximated) reference string of characters within a database of string characters that stores character strings that were previously identified in the images, with their corresponding 3D data (e.g., 3D data estimated by the SLAM algorithm at the keypoints at the pixels of the text).

At decision block 1114 it is determined whether the string matching identified at block 1112 is unique, e.g., there is only one match in the database.

If a matching is determined to be unique (or having much higher probability than other matches, using, for example, Levenshtein Distance), at block 1118, a keypoint (or keypoints) can be generated for the pixel region of the characters that were matched. These features can be used in the relocalization algorithm described above (e.g., at block 212 of FIG. 2).

At block 1116, if no unique matching has been determined at decision block 1114, the feature(s) can be ignored.

In embodiments, the SLAM process can take into account a specific characteristic of the ego-motion kinematics. This can be done by adding constraints to the robotic apparatus motion during the geometric estimation, either using Bundle Adjustment (BA) or Enhanced Kalman Filter (EKF). The constraints are typically related to the magnitude of the derivatives of the position (and angular position) of the robotic apparatus in the environment. For example, smooth motion of the apparatus can be constrained by applying limited acceleration and minimal jerk or any other common criterion for mechanical control.

When SLAM is used for an apparatus that traverses a surface (e.g., a ground traversing robot), the smoothness of the motion can be related to the type of surface traversed. For example, traversing a concrete floor surface may generally result in a smoother motion than traversing raw soil. Other types of surfaces include paved stone, grass, sand. In embodiments described herein, the type of surface that the robotic apparatus can be traversing can be identified using the semantic segmentation. The dynamic parameters of the surface, such as, for example, smoothness, elasticity, and/or plasticity can be adapted according to the semantic class. These parameters can be manifested as the rate at which the acceleration and angular velocity are allowed to change (in high frequency).

When estimating the robot path (geometry estimation), the inertial measurements can be taken into account, i.e., we optimize the path of the robot to have acceleration and angular velocity that agree with the acceleration and angular velocity measured by an IMU. Here we adapt the set of allowable paths. A path on a smooth floor will be allowed to have high-frequency acceleration (>10 Hz) of an amplitude<0.5 m/sec$^2$ and the high-frequency angular velocity (>10 Hz) of an amplitude<0.01 rad/sec. On a rough terrain those numbers can be adapted to <3 m/sec$^2$ and <0.1 rad/sec respectively.

Figure 12:
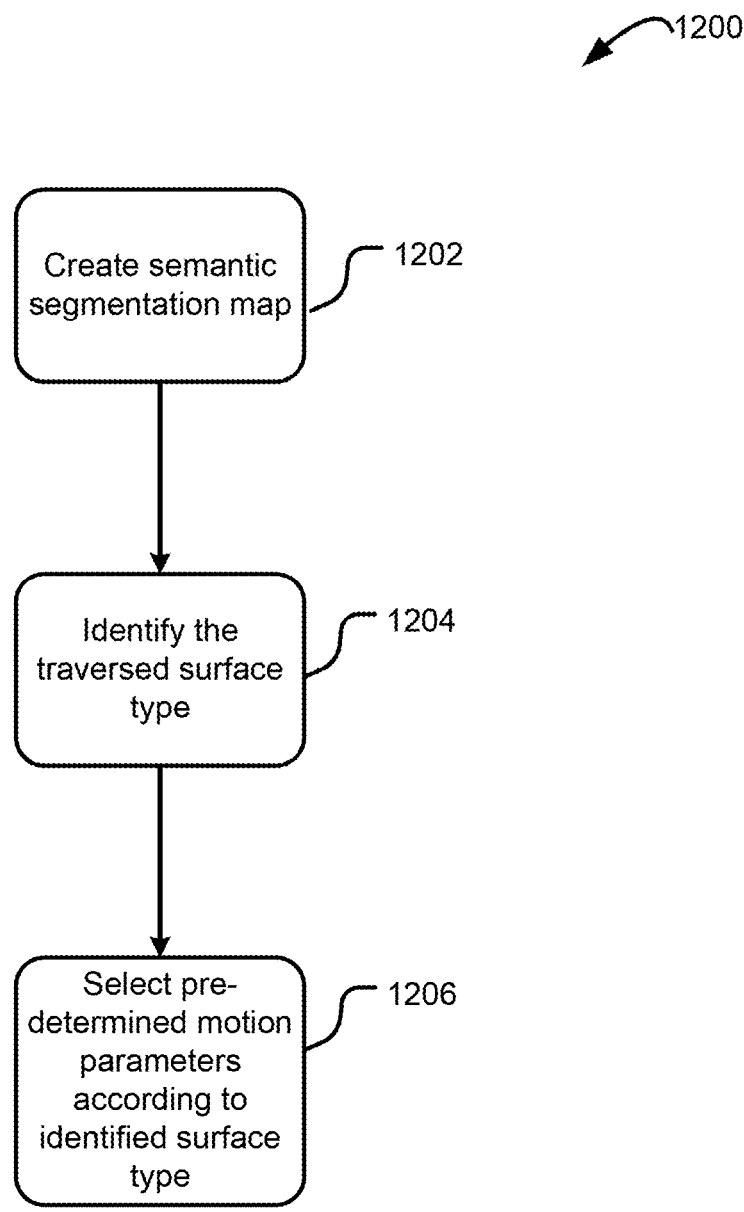
FIG. 12 illustrates an example process of identifying surface parameters in the SLAM process, in accordance with some embodiments.

FIG. 12 illustrates an example process of identifying surface parameters in the SLAM process, in accordance with some embodiments. The process 1200 may be performed by a processing device of the environment recognition system, such as the device 124 of FIG. 1. The process 1200 corresponds to the process described in block 210 of FIG. 2. As shown in FIG. 2, the process can take into account inertial measurements, as in Visual-Inertial SLAM (the inertial measurements are provided at block 209 of FIG. 2).

At block 1202, a semantic segmentation map is created, based on a forward looking camera image, with labels such "paved road," "tiled floor," "soil," "grass," etc.

At block 1204, a part of the map that corresponds to the location of the planed travel path of the robot in the next distance portion (e.g., 2 meters) of the robotic apparatus 100 is extracted from the map and tested for containing labels that belong to a known terrain type. Using the known terrain type labels (if found), the surface type of the travel path can be identified and passed on to block 1206.

At block 1206, the predetermined motion parameters (at this instance of time) are selected. The motion parameters can be selected in accordance with the path surface type identified at block 1204. The motion parameters at time T are then fed to block 210 of FIG. 2.

In embodiments, a SLAM pipeline can incorporate magnetic field measurements. The measurement of the magnetic field, together with the knowledge of the expected magnetic field (normally earth magnetic field), can infer the direction of the sensor system in an absolute coordinates system (e.g., direction of the magnetic north). The ability to measure the absolute direction is greatly beneficial to a SLAM process. However, in practice, the magnetic field has many deviations from the nominal earth magnetic field, mostly due to the presence of ferromagnetic materials and electric current sources in its surroundings. In embodiments, the location of some magnetic interferers, such as cars or light poles, can be identified using their semantic label.

Figure 13:
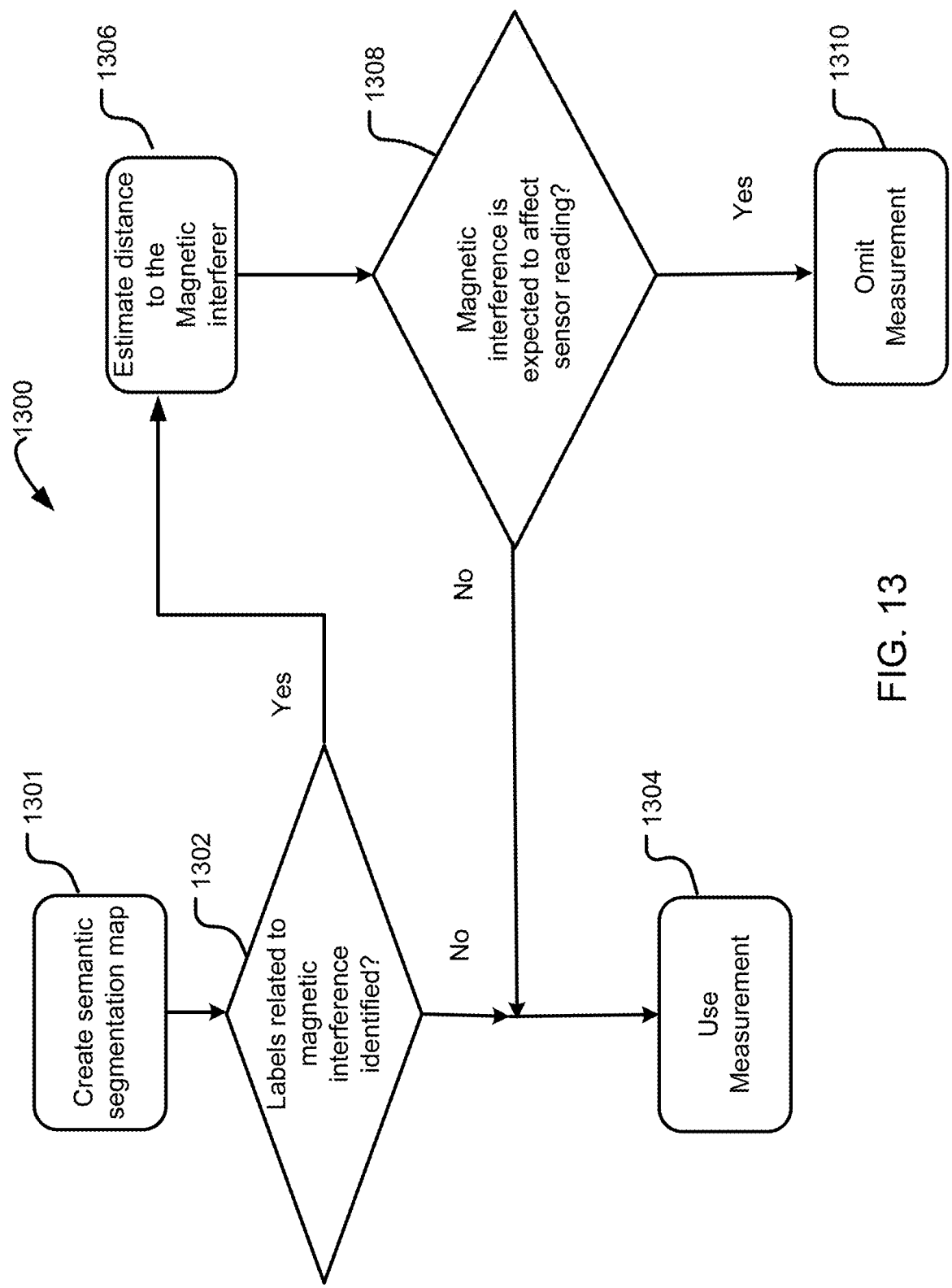
FIG. 13 illustrates an example process of identifying magnetic interference in the SLAM process, in accordance with some embodiments.

FIG. 13 illustrates an example process of identifying magnetic interference in the SLAM process, in accordance with some embodiments. The process 1300 may be performed by a processing device of the system, such as the device 124 of FIG. 1. The process 1300 corresponds to the process of block 209 of FIG. 2.

At block 1301 a semantic segmentation map is created from an image captured by a camera on the device. The semantic map can contain labels that correspond to objects that may be related to a magnetic interference; for example, the labels can include "car," "light pole," "manhole cover," and so on.

At decision block 1302 it is determined whether there are any labels corresponding to the objects that may be related to magnetic interference, applying semantic segmentation on an image from a camera located on the robotic apparatus 100. If no such objects are identified, at block 1304 the magnetic measurements are used for navigation as a source of absolute heading. In other words, if no objects are identified, it can be assumed that the earth geomagnetic field was measured. When such objects are identified at decision block 1302, at block 1306 the distance between the robotic apparatus and the magnetic interferer is estimated, based (e.g.) on the SLAM geometry estimation 210.

At decision block 1308 it is determined whether magnetic interference is expected to affect the magnetometer sensor readings. In embodiments, pre-determined thresholds can be used. For example, threshold distances can be selected as follows: 2 m from a car 1.5 m from a light pole, and 1 m from a manhole cover.

If it is determined that in the proximity to the robotic apparatus the magnetic field interference is expected to influence sensor readings, at block 1310 measurements should be ignored by the SLAM algorithm pipeline. In other words, it is desired to measure earth geomagnetic field without interference.

Earth magnetic field is known and would provide the system with a reference heading (e.g., as in a magnetic compass). If it is determined that in the proximity to the robotic apparatus the magnetic field interference is not expected to influence sensor readings, at block 1304 the magnetic measurements should be used. The distance to the magnetic interferer (or to any other visible object) is a direct result of the SLAM algorithm, specifically, block 210 of the process 200 of FIG. 2. The distance of the interference effect can be predetermined (e.g., 1 meter for a ferrimagnet, 2 meters for electrical current).

As noted above, in the SLAM pipeline execution, data related to environment and its objects is accumulated. It is a common practice to apply filtering/culling of the data (mostly 3D features and keyframes) in order to maintain bounded memory and runtime. In embodiments, filtering processes can have a typical time scale, which is the rate of information decay. The filtering time scale can be adjusted to match to the feature mobility time scale of the feature(s). For example, each feature can be assigned a creation time (i.e., the time the feature was observed) and a mobility time scale (assigned from Table 1, using the semantic label from block 408 of FIG. 4). A feature can be culled if the time period that elapsed since feature creation is greater than the mobility time scale. The map maintenance and culling are described in reference to block 214 of FIG. 2.

Figure 16:
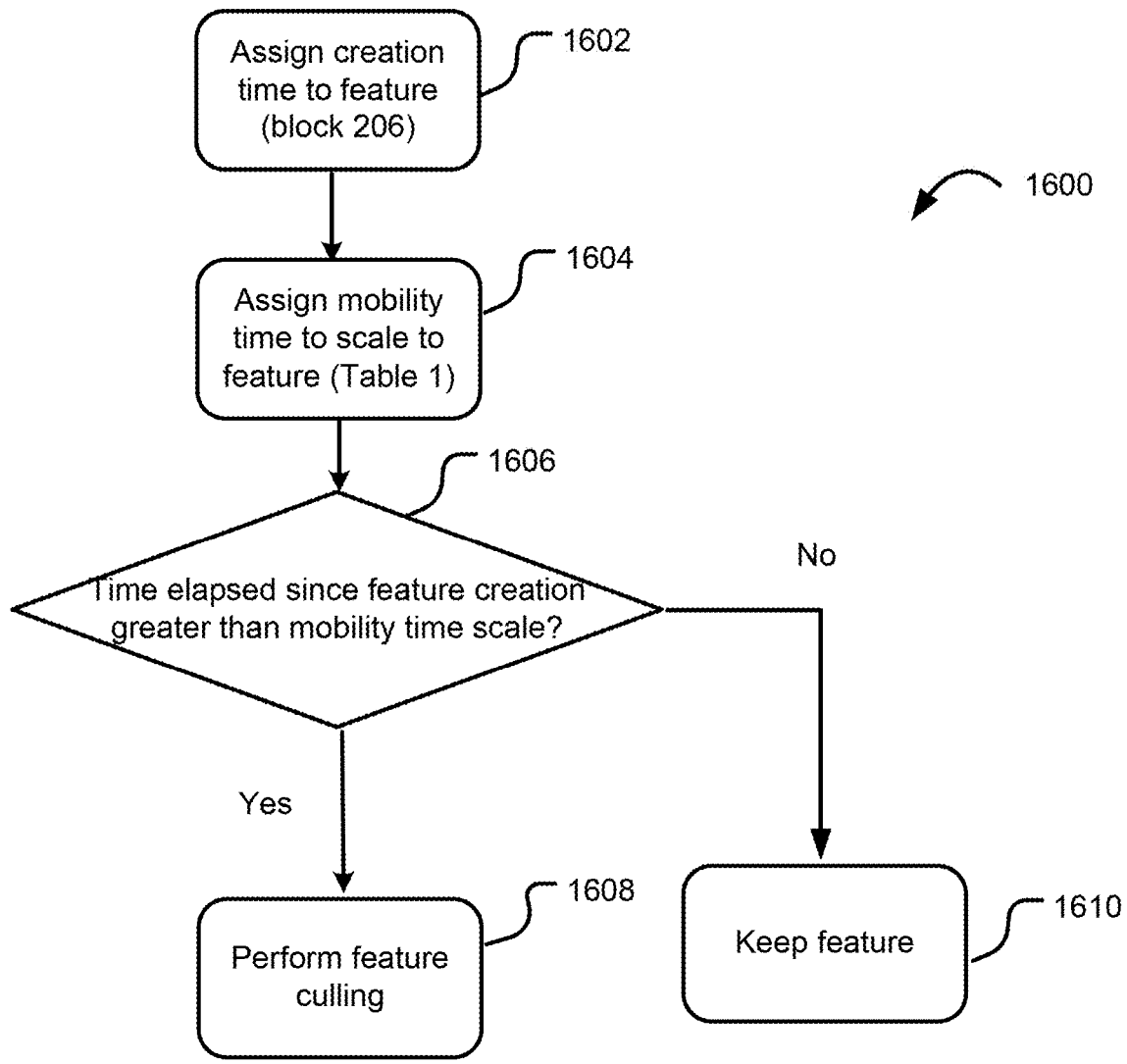
FIG. 16 illustrates an example process of feature culling based on semantic information, in accordance with some embodiments.

FIG. 16 illustrates an example process of feature culling based on semantic information, in accordance with some embodiments. The process 1600 may be performed by a processing device of the system, such as the device 124 of FIG. 1, and describes the process of block 214 of FIG. 2 in greater detail.

At block 1602, the creation time is assigned to a feature of the image. This process can be performed at block 206 of FIG. 2. The creation time may be a part of the tracking records associated with keypoints as noted in reference to block 206 of FIG. 2.

At block 1604, based on the semantic label of a feature (provided at block 408 of FIG. 4), a mobility time scale can be assigned to the feature (see Table 1).

At decision block 1606 the time elapsed since feature creation is compared to the mobility time scale of the feature. If this time is greater than the mobility time scale, the feature is culled at block 1608. If this time elapsed since feature creation is equal to or smaller than the mobility time scale, the feature is kept at block 1610. It should be noted that the process performed at blocks 1606, 1608, and 1610 is a repeating process; in other words, the decision regarding performance (or non-performance) of feature culling can be re-examined repeatedly every time period, for example, 1 minute.

In summary, in some implementations, such as the robotic apparatus 100 (that could be mounted on a mobile platform) the detected objects can be placed on a global map. It should be noted that the described embodiments may be implemented on a broader scale than on a robotic apparatus. In general, the described embodiments may be applied in any technological solution that requires a scene geometry estimation.

Figure 14:
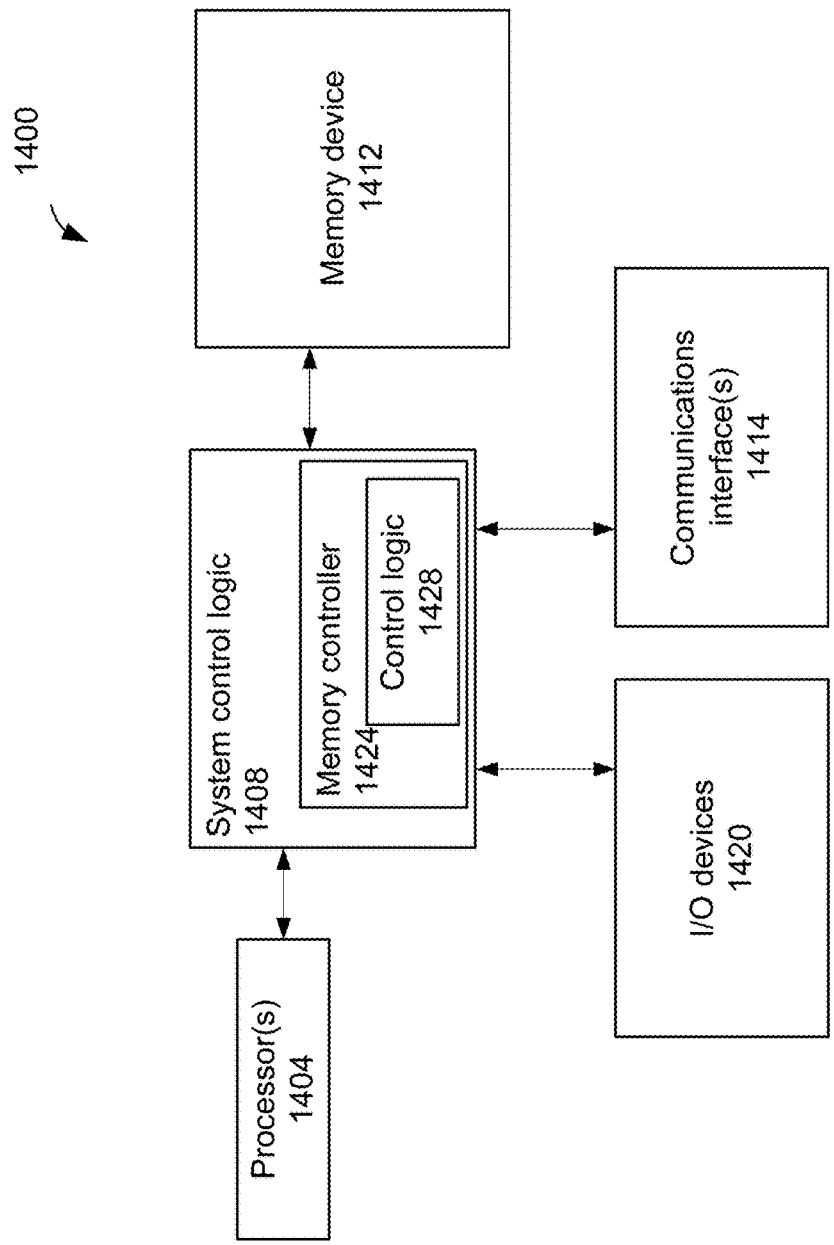
FIG. 14 illustrates an example computing device suitable for use to practice all or selected aspects of the present disclosure, in accordance with some embodiments.

FIG. 14 illustrates an example computing device suitable for use to practice all or selected aspects of the present disclosure, in accordance with some embodiments. More specifically, the computing device 1400 may be configured to perform some or all of the functions of the processing device 124 and/or external computing device 140 of FIG. 1. In some embodiments, the computing device 1400 may be configured as a special purpose computing device, i.e., a computing device configured solely for the purpose of performing operations associated with the environment recognition by a robotic apparatus, such as the processes of FIGS. 2-13, and not for general purpose computing, such as processor based devices configured for use as set-top box, game console, smartphones, e-book, tablets for consuming audio/video contents, and so forth. In some embodiments, the computing device 1400 may be configured as a general purpose computing device, with facilities configured to execute virtually any binaries (subject only to computing cycles, and/or memory/storage constraints).

As shown, the computing device 1400 includes system control logic 1408 coupled to one or more processor(s) 1404; a memory device 1412; one or more communications interface(s) 1414; and input/output (I/O) devices 1420.

The memory device 1412 may be a non-volatile computer storage chip. In embodiments, the memory device 1412 comprises a package, driver circuitry (e.g., drivers), input/output connections to electrically couple the memory device 1412 with other components of the computing device 1400, etc. The memory device 1412 may be configured to be removably or permanently coupled with the computing device 1400.

Communications interface(s) 1414 may provide an interface for computing device 1400 to communicate over one or more network(s) and/or with any other suitable device, e.g., in the system described in reference to FIG. 1. Communications interface(s) 1414 may include any suitable hardware and/or firmware. Communications interface(s) 1414 for one embodiment may include, for example, a network adapter, a wireless network adapter, a telephone modem, and/or a wireless modem. For wireless communications, communications interface(s) 1414 for one embodiment may use one or more antennas to communicatively couple the computing device 1400 with a wireless network.

For one embodiment, at least one of the processor(s) 1404 may be packaged together with logic for one or more controller(s) of system control logic 1408. For one embodiment, at least one of the processor(s) 1404 may be packaged together with logic for one or more controllers of system control logic 1408 to form a System in Package (SiP). For one embodiment, at least one of the processor(s) 1404 may be integrated on the same die with logic for one or more controller(s) of system control logic 1408. For one embodiment, at least one of the processor(s) 1404 may be integrated on the same die with logic for one or more controller(s) of system control logic 1408 to form a System on Chip (SoC).

System control logic 1408 for one embodiment may include any suitable interface controllers to provide for any suitable interface to at least one of the processor(s) 1404 and/or to any suitable device or component in communication with system control logic 1408. The system control logic 1408 may move data into and/or out of the various components of the computing device 1400.

System control logic 1408 for one embodiment may include a memory controller 1424 to provide an interface to the memory device 1412 to control various memory access operations. The memory controller 1424 may include control logic 1428 that may be specifically configured to control access of the memory device 1412.

In various embodiments, the I/O devices 1420 may include user interfaces designed to enable user interaction with the computing device 1400, peripheral component interfaces designed to enable peripheral component interaction with the computing device 1400, and/or sensors designed to determine environmental conditions and/or location information related to the computing device 1400.

In various embodiments, the user interfaces could include, but are not limited to, a display, e.g., a liquid crystal display, a touch screen display, etc., a speaker, a microphone, one or more digital cameras to capture pictures and/or video, a flashlight (e.g., a light emitting diode flash), and a keyboard.

In various embodiments, the peripheral component interfaces may include, but are not limited to, a non-volatile memory port, an audio jack, and a power supply interface. In various embodiments, the sensors may include, but are not limited to, a gyro sensor, an accelerometer, a proximity sensor, an ambient light sensor, and a positioning unit. The positioning unit may additionally/alternatively be part of, or interact with, the communication interface(s) 1414 to communicate with components of a positioning network, e.g., a global positioning system (GPS) satellite.

In some implementations, the computing device 1400 may comprise a general purpose computing device, such as a laptop, a netbook, a notebook, an ultrabook, a desktop computer, or a server. In further implementations, the computing device 1400 may be any other electronic device that processes data.

Figure 15:
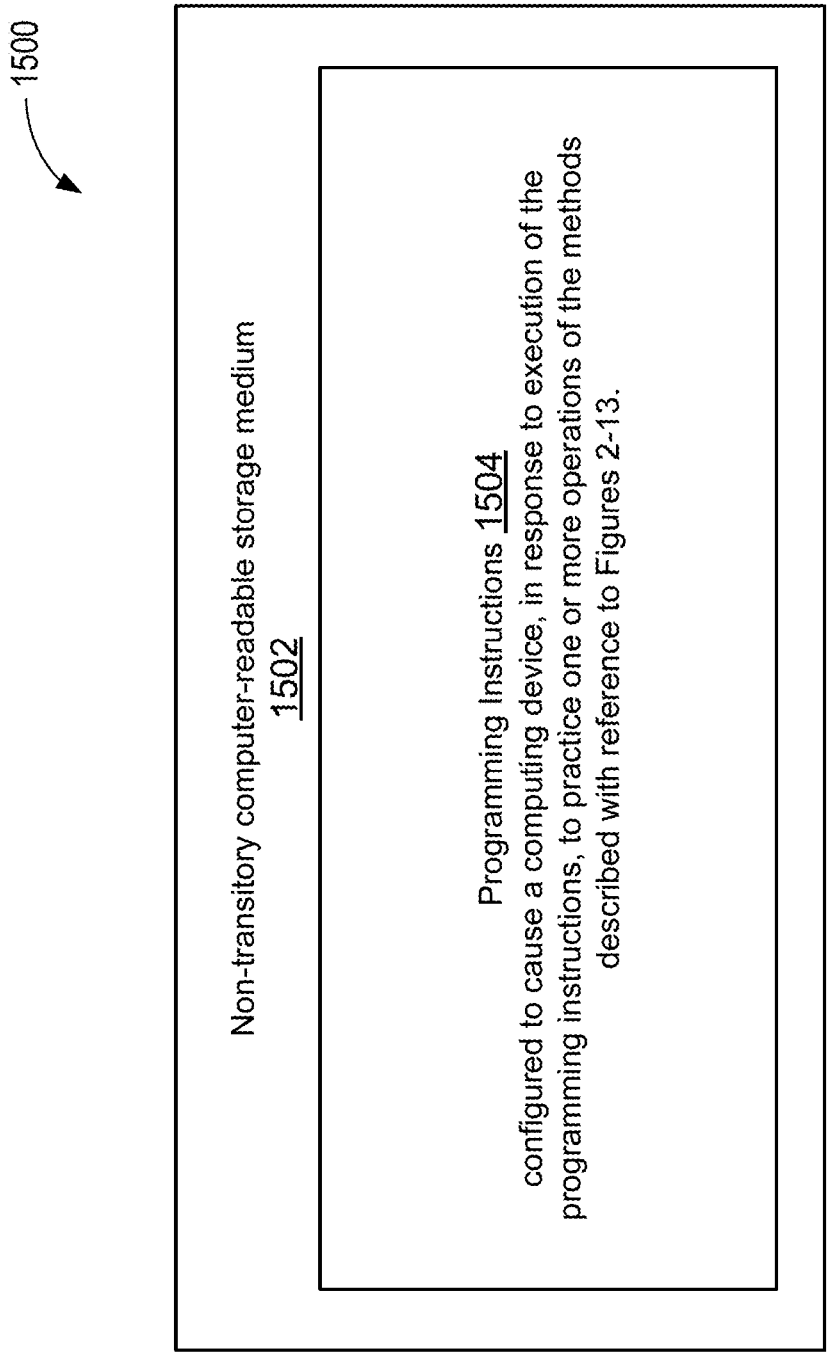
FIG. 15 illustrates an example computer-readable storage medium having instructions configured to cause a processor-based device to practice all or selected aspects of the present disclosure, in accordance with some embodiments.

FIG. 15 illustrates an example computer-readable storage medium having instructions configured to cause a processor-based device to practice all or selected aspects of the present disclosure, in accordance with some embodiments. As illustrated, computer-readable storage medium 1502 may include a number of programming instructions or bit streams 1504. Executable code of programming instructions (or bit streams) 1504 may be configured to enable a device, e.g., computing device 1400, in response to execution of the executable code/programming instructions to perform (aspects of) processes performed by processing device 124, external device 140, or corresponding components described in reference to FIG. 1.

In alternate embodiments, executable code/programming instructions/bit streams 1504 may be disposed on multiple non-transitory computing device-readable storage media 1502 instead. In embodiments, computing device-readable storage medium 1502 may be non-transitory. In still other embodiments, executable code/programming instructions 1504 may be encoded in a transitory computer readable medium, such as signals.

According to various embodiments, the present disclosure describes a number of examples.

Example 1 is an apparatus, comprising: a body of the apparatus; and an environment recognition system mounted on the body of the apparatus, wherein the environment recognition system includes: one or more light sources, to illuminate at least a portion of an environment that surrounds the apparatus; a camera, to capture one or more images of the illuminated portion of the environment; and a processing device coupled with the camera and the one or more light sources, to process the captured one or more images, using semantic segmentation of the one or more images applied in a Simultaneous Localization and Mapping (SLAM), to identify a position of the body of the apparatus, and/or a position of one or more objects disposed in the illuminated portion of the environment, based at least in part on a result of the processing of the one or more images.

Example 2 includes the subject matter of Example 1, wherein the processing device is to provide the result of the processing of the images to an external device, to cause the external device to detect the one or more images.

Example 3 includes the subject matter of Example 1, wherein to process the captured one or more images, the processing device is to perform image acquisition and identify exposure parameters, using the semantic segmentation, which includes to predict a semantic segmentation map associated with the portion of the environment, assign weights to pixels in the one or more images according to their respective semantic labels provided in the semantic segmentation map, and to adjust the exposure parameters based at least in part on the assigned weights.

Example 4 includes the subject matter of Example 1, wherein to process the captured one or more images, the processing device is to perform tracking of image features and estimation of geometry of the one or more objects, using the sematic segmentation, which includes applying semantic criteria to a filter to select and assign semantic categories to keypoints associated with the portion of the environment, and tracking the image features between frames of the images using the keypoints with assigned semantic categories.

Example 5 includes the subject matter of Example 1, wherein to process the captured one or more images, the processing device is to perform relocalization of the one or more objects in the portion of the environment, based at least in part on matching corresponding keypoints between frames of the images, using learned feature descriptors.

Example 6 includes the subject matter of Example 1, wherein the processing device is to aggregate semantic segmentation map information in a three-dimensional (3D) data structure, and generate a volumetric semantic map based at least in part on the semantic segmentation map information.

Example 7 includes the subject matter of Example 6, wherein the processing device is to align the aggregated semantic segmentation maps with a global semantic map generated prior to the processing of the one or more images.

Example 8 includes the subject matter of Example 1, wherein the processing device is to perform relocalization using object segmentation, which includes to assign labels to different instances of a class of objects, and aggregate feature descriptors associated with an object to create object-level descriptors.

Example 9 includes the subject matter of Example 1, wherein the processing device is to perform text processing, which includes to classify detected features as a text, perform clustering of the features that belong to a logical unit, translate the clustered features to the text, and match the clustered features to corresponding features stored in a feature database.

Example 10 includes the subject matter of Example 1, wherein the processing device is to perform identification of surface parameters associated with the environment, based at least in part on a semantic segmentation map associated with the environment.

Example 11 includes the subject matter of Example 1, wherein the processing device is to perform magnetic field measurements associated with the environment, based at least in part on a semantic segmentation map associated with the environment.

Example 12 includes the subject matter of Example 1, wherein the processing device is to perform feature culling, based at least in part on a comparison between a time that elapsed since creation of a feature and a mobility time scale associated with the feature.

Example 13 is a computing device-implemented method, comprising: obtaining, by a computing device, one or more images of at least a portion of an environment; and processing, by the computing device, the obtained one or more images, using semantic segmentation of the one or more images applied in a Simultaneous Localization and Mapping (SLAM), to identify a position of a robotic apparatus associated with the computing device, and/or a position of one or more objects disposed in the portion of the environment, based at least in part on a result of the processing of the one or more images.

Example 14 includes the subject matter of Example 13, wherein obtaining one or more images includes receiving, by the computing device, the one or more images from a camera coupled with the computing device.

Example 15 includes the subject matter of Example 13, further comprising: performing, by the computing device, image acquisition and identify exposure parameters, using the semantic segmentation, including: predicting, by the computing device, a semantic segmentation map associated with the portion of the environment; assigning, by the computing device, weights to pixels in the one or more images according to their respective semantic labels provided in the semantic segmentation map; and adjusting, by the computing device, the exposure parameters based at least in part on the assigned weights.

Example 16 includes the subject matter of Example 13, further comprising: performing, by the computing device, tracking of image features and estimation of geometry of the one or more objects, using the sematic segmentation, which includes assigning semantic categories to keypoints associated with the portion of the environment, based at least in part on a semantic segmentation map associated with the portion of the environment, and tracking the image features between frames of the images using the keypoints with assigned semantic categories.

Example 17 includes the subject matter of Example 13, further comprising: performing, by the computing device, relocalization of the one or more objects in the portion of the environment, based at least in part on matching corresponding keypoints between frames of the images, using learned feature descriptors.

Example 18 is an environment recognition system mounted on a body of an apparatus, comprising: one or more light sources, to illuminate at least a portion of an environment that surrounds the apparatus; a camera, to capture one or more images of the illuminated portion of the environment; and a processing device coupled with the camera and the one or more light sources, to process the captured one or more images, using semantic segmentation of the one or more images applied in a Simultaneous Localization and Mapping (SLAM), to identify a position of the body of the apparatus, and/or a position of one or more objects disposed in the illuminated portion of the environment, based at least in part on a result of the processing of the one or more images.

Example 19 includes the subject matter of Example 18, wherein to process the captured one or more images, the processing device is to perform image acquisition and identify exposure parameters, using the semantic segmentation, which includes to predict a semantic segmentation map associated with the portion of the environment, assign weights to pixels in the one or more images according to their respective semantic labels provided in the semantic segmentation map, and to adjust the exposure parameters based at least in part on the assigned weights.

Example 20 includes the subject matter of Example 18, wherein to process the captured one or more images, the processing device is to perform tracking of image features and estimation of geometry of the one or more objects, using the sematic segmentation, which includes assigning semantic categories to keypoints associated with the portion of the environment, based at least in part on a semantic segmentation map associated with the portion of the environment, and tracking the image features between frames of the images using the keypoints with assigned semantic categories.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. An apparatus, comprising:
    a body of the apparatus; and
    an environment recognition system mounted on the body of the apparatus, wherein the environment recognition system includes:
    one or more light sources, to illuminate at least a portion of an environment that surrounds the apparatus;
    a camera, to capture one or more images of the illuminated portion of the environment; and
    a processing device coupled with the camera and the one or more light sources, to:
    process the captured one or more images, using semantic segmentation of the one or more images applied in a Simultaneous Localization and Mapping (SLAM), to identify a position of the body of the apparatus, and a position of one or more objects disposed in the illuminated portion of the environment, based at least in part on a result of the processing of the one or more images, wherein to process the captured one or more images, the processing device is to perform image acquisition and identify exposure parameters, using the semantic segmentation, which includes to predict a semantic segmentation map associated with the portion of the environment, assign weights to pixels in the one or more images according to their respective semantic labels provided in the semantic segmentation map, and to adjust the exposure parameters based at least in part on the assigned weights; and
    aggregate semantic segmentation map information in a three-dimensional (3D) data structure, and generate a volumetric semantic map based at least in part on the semantic segmentation map information, including to align the aggregated semantic segmentation map with a global semantic map generated prior to the processing of the one or more images.

2. The apparatus of claim 1, wherein the processing device is to provide the result of the processing of the images to an external processor, to cause the external processor to detect the one or more images.

3. The apparatus of claim 1, wherein to process the captured one or more images, the processing device is to perform tracking of image features and estimation of geometry of the one or more objects, using the sematic segmentation, which includes applying semantic criteria to a filter to select and assign semantic categories to keypoints associated with the portion of the environment, and tracking the image features between frames of the images using the keypoints with assigned semantic categories.

4. The apparatus of claim 1, wherein to process the captured one or more images, the processing device is to perform relocalization of the one or more objects in the portion of the environment, based at least in part on matching corresponding keypoints between frames of the images, using learned feature descriptors.

5. The apparatus of claim 1, wherein the processing device is to perform relocalization using object segmentation, which includes to assign labels to different instances of a class of objects, and aggregate feature descriptors associated with an object to create object-level descriptors.

6. The apparatus of claim 1, wherein the processing device is to perform text processing, which includes to classify detected features as a text, perform clustering of the features, translate the clustered features to the text, and match the clustered features to corresponding features stored in a feature database.

7. The apparatus of claim 1, wherein the processing device is to perform identification of surface parameters associated with the environment, based at least in part on a semantic segmentation map associated with the environment.

8. The apparatus of claim 1, wherein the processing device is to perform magnetic field measurements associated with the environment, based at least in part on a semantic segmentation map associated with the environment.

9. The apparatus of claim 1, wherein the processing device is to perform feature culling, based at least in part on a comparison between a time that elapsed since creation of a feature and a mobility time scale associated with the feature.

10. A computer-implemented method, comprising:
    obtaining, by a computer coupled with a camera and one or more light sources, one or more images of at least a portion of an environment illuminated by the light sources and captured by the camera;

processing, by the computer, the obtained one or more images, using semantic segmentation of the one or more images applied in a Simultaneous Localization and Mapping (SLAM), to identify a position of a robotic apparatus associated with the computer, and a position of one or more objects disposed in the portion of the environment, based at least in part on a result of the processing of the one or more images, including performing image acquisition and identify exposure parameters, using the semantic segmentation, which includes to predicting a semantic segmentation map associated with the portion of the environment, assigning weights to pixels in the one or more images according to their respective semantic labels provided in the semantic segmentation map, and to adjusting the exposure parameters based at least in part on the assigned weights; and aggregating, by the computer, semantic segmentation map information in a three-dimensional (3D) data structure, and generating a volumetric semantic map based at least in part on the semantic segmentation map information, including to aligning the aggregated semantic segmentation maps information with a global semantic map generated prior to the processing of the one or more images.

11. The method of claim 10, wherein obtaining one or more images includes receiving, by the computer, the one or more images from a camera coupled with the computer.

12. The method of claim 10, further comprising: performing, by the computer, image acquisition and identify exposure parameters, using the semantic segmentation, including: predicting, by the computer, a semantic segmentation map associated with the portion of the environment; assigning, by the computer, weights to pixels in the one or more images according to their respective semantic labels provided in the semantic segmentation map; and adjusting, by the computer, the exposure parameters based at least in part on the assigned weights.

13. The method of claim 10, further comprising:
performing, by the computer, tracking of image features and estimation of geometry of the one or more objects, using the sematic segmentation, which includes assigning semantic categories to keypoints associated with the portion of the environment, based at least in part on a semantic segmentation map associated with the portion of the environment, and tracking the image features between frames of the images using the keypoints with assigned semantic categories.

14. The method of claim 10, further comprising: performing, by the computer, relocalization of the one or more objects in the portion of the environment, based at least in part on matching corresponding keypoints between frames of the images, using learned feature descriptors.

15. An environment recognition system mounted on a body of an apparatus, comprising:
one or more light sources, to illuminate at least a portion of an environment that surrounds the apparatus;
a camera, to capture one or more images of the illuminated portion of the environment; and
a processing device coupled with the camera and the one or more light sources, to process the captured one or more images, using semantic segmentation of the one or more images applied in a Simultaneous Localization and Mapping (SLAM), to identify a position of the body of the apparatus, and/or a position of one or more objects disposed in the illuminated portion of the environment, based at least in part on a result of the processing of the one or more images,
wherein to process the captured one or more images, the processing device is to perform image acquisition and identify exposure parameters, using the semantic segmentation, which includes to predict a semantic segmentation map associated with the portion of the environment, assign weights to pixels in the one or more images according to their respective semantic labels provided in the semantic segmentation map, and to adjust the exposure parameters based at least in part on the assigned weights; and
perform feature culling, based at least in part on a comparison between a time that elapsed since creation of a feature and a mobility time scale associated with the feature.

16. The environment recognition system of claim 15, wherein to process the captured one or more images, the processing device is to perform tracking of image features and estimation of geometry of the one or more objects, using the sematic segmentation, which includes assigning semantic categories to keypoints associated with the portion of the environment, based at least in part on a semantic segmentation map associated with the portion of the environment, and tracking the image features between frames of the images using the keypoints with assigned semantic categories.

17. The environment recognition system of claim 15, wherein the processing device is to perform relocalization using object segmentation, which includes to assign labels to different instances of a class of objects, and aggregate feature descriptors associated with an object to create object-level descriptors.

18. The environment recognition system of claim 15, wherein the processing device is to perform text processing, which includes to classify detected features as a text, perform clustering of the features that belong to a logical unit, translate the clustered features to the text, and match the clustered features to corresponding features stored in a feature database.

19. The environment recognition system of claim 15, wherein the processing device is to perform identification of surface parameters associated with the environment, based at least in part on a semantic segmentation map associated with the environment.

20. The environment recognition system of claim 15, wherein the processing device is to perform magnetic field measurements associated with the environment, based at least in part on a semantic segmentation map associated with the environment.

* * * * *